US012054335B2

(12) United States Patent
Blomenkemper et al.

(10) Patent No.: US 12,054,335 B2
(45) Date of Patent: Aug. 6, 2024

(54) DEVICE AND METHOD FOR DISPENSING ACTIVE INGREDIENT-CONTAINING OR ACTIVE INGREDIENT-CARRYING STRIPS

(71) Applicant: LTS LOHMANN THERAPIE-SYSTEME AG, Andernach (DE)

(72) Inventors: Marc Blomenkemper, Neuwied (DE); Michael Linn, Waldboeckelheim (DE); Ronald Hackbarth, Koblenz (DE); Markus Bee, Kettig (DE)

(73) Assignee: LTS LOHMANN THERAPIE-SYSTEME AG, Andernach (DE)

( * ) Notice: Subject to any disclaimer, the term of this patent is extended or adjusted under 35 U.S.C. 154(b) by 0 days.

(21) Appl. No.: 18/119,897

(22) Filed: Mar. 10, 2023

(65) Prior Publication Data

US 2023/0211941 A1 Jul. 6, 2023

Related U.S. Application Data

(60) Division of application No. 17/145,534, filed on Jan. 11, 2021, now Pat. No. 11,634,268, which is a (Continued)

(30) Foreign Application Priority Data

Apr. 26, 2016 (EP) .................................... 16167074

(51) Int. Cl.
*A61J 7/00* (2006.01)
*B65D 83/08* (2006.01)
(Continued)

(52) U.S. Cl.
CPC ........ *B65D 83/0829* (2013.01); *A61J 7/0053* (2013.01); *A61J 7/0076* (2013.01);
(Continued)

(58) Field of Classification Search
CPC ....... A61J 7/0053; A61J 7/0076; B65D 75/42; B65D 83/0472; B65D 83/0829;
(Continued)

(56) References Cited

U.S. PATENT DOCUMENTS 1,749,407 A * 3/1930 Beach ................ B65H 35/0046 226/190
3,061,162 A * 10/1962 Adams .................... B65C 11/00 226/110
(Continued)

*Primary Examiner* — Gene O Crawford
*Assistant Examiner* — Kelvin L Randall, Jr.
(74) *Attorney, Agent, or Firm* — Ronald S. Lombard

(57) ABSTRACT

A device for dispensing active ingredient-containing or active ingredient-carrying strips, including a housing in which a coil chamber for receiving an active ingredient-containing or active ingredient-carrying band is arranged, in which a gear transmission with a driven roller for conveying the band is mounted, and in which a separating device for separating the strips from the band is arranged. A method for dispensing active ingredient-containing or active ingredient carrying strips using such a device is also disclosed. An active ingredient-containing or active ingredient-carrying band is arranged between the driven roller and the pressure roller. A shift clutch transmission having a manually actuatable trigger element is arranged upstream of the gear transmission. The driven roller can be driven in incremental strips by the shift clutch transmission. A device and method is disclosed for dispensing active ingredient-containing or active ingredient-carrying strips with a largely equal dosage are developed.

12 Claims, 11 Drawing Sheets

Related U.S. Application Data division of application No. 16/162,825, filed on Oct. 17, 2018, now Pat. No. 10,926,941, which is a continuation-in-part of application No. PCT/EP2017/059374, filed on Apr. 20, 2017.

(51) Int. Cl.
*B65H 16/00* (2006.01)
*B65H 35/00* (2006.01)

(52) U.S. Cl.
CPC ....... *B65D 83/0841* (2013.01); *B65H 16/005* (2013.01); *B65H 35/0086* (2013.01); *B65H 35/0093* (2013.01); *B65H 2403/941* (2013.01); *B65H 2404/14* (2013.01)

(58) Field of Classification Search
CPC ............ B65D 83/0841; B65D 83/0882; B65H 16/005; B65H 35/0086; B65H 35/0093; B65H 2403/941; B65H 2404/14
See application file for complete search history.

(56) References Cited

U.S. PATENT DOCUMENTS

| | | | | | |
|---|---|---|---|---|---|
| 3,838,761 | A * | 10/1974 | Hakansson | G07F 11/68 | 194/281 |
| 4,041,863 | A * | 8/1977 | Mullen | B65C 11/0247 | 101/100 |
| 4,150,741 | A * | 4/1979 | Rubin | G07F 11/68 | 83/205 |
| 5,392,822 | A * | 2/1995 | Kraus | B65B 13/027 | 140/93.2 |
| 6,176,409 | B1 * | 1/2001 | Lee | B65H 35/0086 | 156/577 |
| 7,121,499 | B2 * | 10/2006 | Lammers | B65H 35/0033 | 83/13 |
| 7,347,134 | B2 * | 3/2008 | Lewis | A47K 10/36 | 225/10 |
| 8,333,729 | B2 * | 12/2012 | Discher, Jr. | A61M 5/31 | 604/58 |
| 9,327,486 | B2 * | 5/2016 | Poplawski | B32B 38/04 | |
| 9,351,907 | B2 * | 5/2016 | Luoma | A61J 7/04 | |
| 2007/0114239 | A1 * | 5/2007 | Smith | B65D 83/0409 | 221/263 |
| 2008/0083487 | A1 * | 4/2008 | Moss | B65H 35/006 | 156/577 |
| 2011/0095063 | A1 * | 4/2011 | Hagleitner | A47K 10/3612 | 226/188 |
| 2013/0066463 | A1 * | 3/2013 | Luoma | G16H 20/13 | 700/232 |
| 2014/0312050 | A1 * | 10/2014 | Coggins | A61B 50/30 | 221/71 |
| 2015/0148943 | A1 * | 5/2015 | Sullivan | A61J 7/0076 | 700/231 |

* cited by examiner

DEVICE AND METHOD FOR DISPENSING ACTIVE INGREDIENT-CONTAINING OR ACTIVE INGREDIENT-CARRYING STRIPS

CROSS-REFERENCE TO RELATED APPLICATIONS

This is a divisional application claiming the benefit of pending U.S. patent application Ser. No. 17/145,534 filed Jan. 11, 2021 which is a divisional application claiming the benefit of U.S. patent application Ser. No. 16/162,825 filed Oct. 17, 2018 which is a continuation-in-part application of pending international application No. PCT/EP2017/059374 filed Apr. 20, 2017 claiming the priority of European application No. EP16167074.0 filed Apr. 26, 2016. The said U.S. patent application Ser. No. 17/145,534, U.S. patent application Ser. No. 16/162,825, international application No. PCT/EP2017/059374, and European application No. EP16167074.0 are incorporated herein by reference in their entireties as though fully set forth.

BACKGROUND OF THE INVENTION

The invention relates to a device for dispensing active ingredient-containing or active ingredient-carrying strips, having a housing, in which housing there is arranged a spool chamber for accommodating an active ingredient-containing or active ingredient-carrying band, in which housing there is mounted a wheel transmission with an output roller for conveying the band, and in which housing there is arranged a severing device for severing the strips from the band, and to a method for dispensing active ingredient-containing or active ingredient-carrying strips by means of a device of said type, wherein an active ingredient-containing or active ingredient-carrying band is arranged between the output roller and the pressure-exerting roller.

EP 0 953 362 A2 has disclosed a device of said type. It requires a battery-fed electric drive which drives two toothed wheels in opposite directions. The band to be conveyed is pressed between the toothed wheels by means of a pressure-exerting spring. The dosing quantity can be controlled by means of an electric control device.

The present invention is based on the problem of developing a device and a method for dispensing active ingredient-containing or active ingredient-carrying strips with a substantially uniform active ingredient dose.

SUMMARY OF THE INVENTION

Said problem is solved by means of the features of the claims. For this purpose, an indexing coupling mechanism is positioned upstream of the wheel transmission. The indexing coupling mechanism has a manually actuatable triggering element. The output roller is driveable in incremental steps by means of the indexing coupling mechanism.

During the use of the device, a manual actuation of the triggering element triggers an indexing of the indexing coupling mechanism. The indexing of the indexing coupling mechanism couples a movement of the triggering element to the rotation of a drive wheel, such that the drive wheel rotates through a defined angle of rotation. The drive wheel transmits the rotational movement by means of the wheel transmission to the output roller. The rotating output roller conveys the band. The conveying of the band by the travel that is dependent on the defined angle of rotation of the drive wheel releases the severing device. A strip is severed from the band by means of the severing device.

The actuation of the indexing coupling mechanism by means of a pushbutton, pull grip or rotary switch causes a stepwise rotation of the drive wheel. The angle of rotation of the drive wheel amounts to one unit or an integer multiple of said one unit. After the rotation of the drive wheel, the latter assumes a new stable angular position in relation to its axis of rotation, and the triggering element returns into its initial position. By means of the downstream wheel transmission, the rotational movement of the drive wheel is transmitted to an output roller, which conveys the active ingredient-containing or active ingredient-carrying band out of a spool chamber in the direction of a discharge region. After the end of the conveying process of the band, active ingredient-containing or active ingredient-carrying strips are severed from said band by means of a severing device. Here, the severing device is actuated separately or by means of the triggering element. After the removal of the strip from the discharge region, a further strip can be generated. The device blocks a backward displacement of strips that have already been conveyed. The strip dispenser operates purely mechanically.

BRIEF DESCRIPTION OF THE DRAWINGS

Further details of the invention will emerge from the claims and from the following descriptions of schematically illustrated exemplary embodiments.

DETAILED DESCRIPTION OF THE INVENTION

Figure 1:
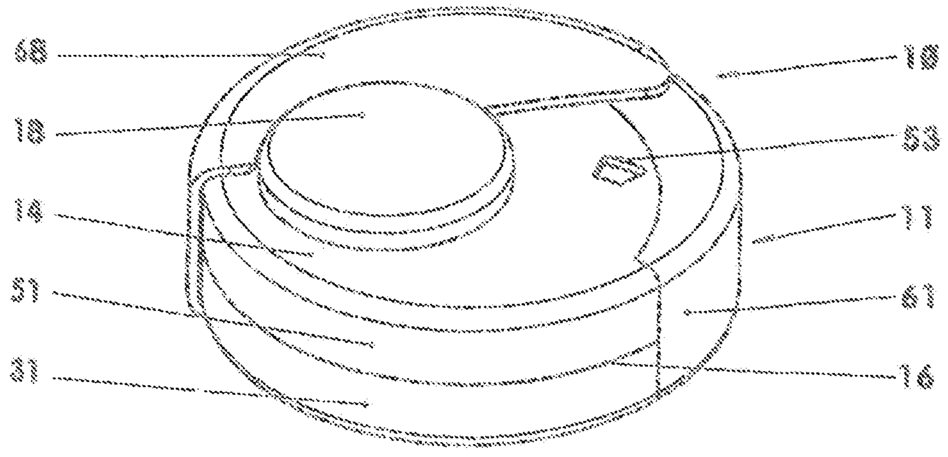
FIG. 1: isometric view of a device for dispensing strips.

FIGS. 1-5 show a first embodiment of a device (10) for dispensing strips. Such devices (10) are used to discharge an exact dose of an active ingredient, for example insulin, to the user or to a patient.

The device (10) comprises a housing (11) in which there are arranged a spool chamber (12), a drive device (71) and a severing device (161). The housing (11) has at least approximately the form of a cylindrical disk with a bottom side (13) and a top side (14). The longitudinal direction (15) is hereinafter defined as the normal with respect to the planar region of the bottom side (13) and of the top side (14). At the bottom side (13), there is arranged an indexing button (91) as triggering and actuating element (91). Opposite the indexing button (91), that is to say at its top side (14), the housing (11) has a protruding cover (18). The non-actuated device (10) is thus at least approximately symmetrical with respect to its central transverse plane. A discharge region (17) arranged at the circumferential surface (16) of the housing (11) is closed off in the illustration in FIG. 1 by means of a protective flap (68).

Figure 2:
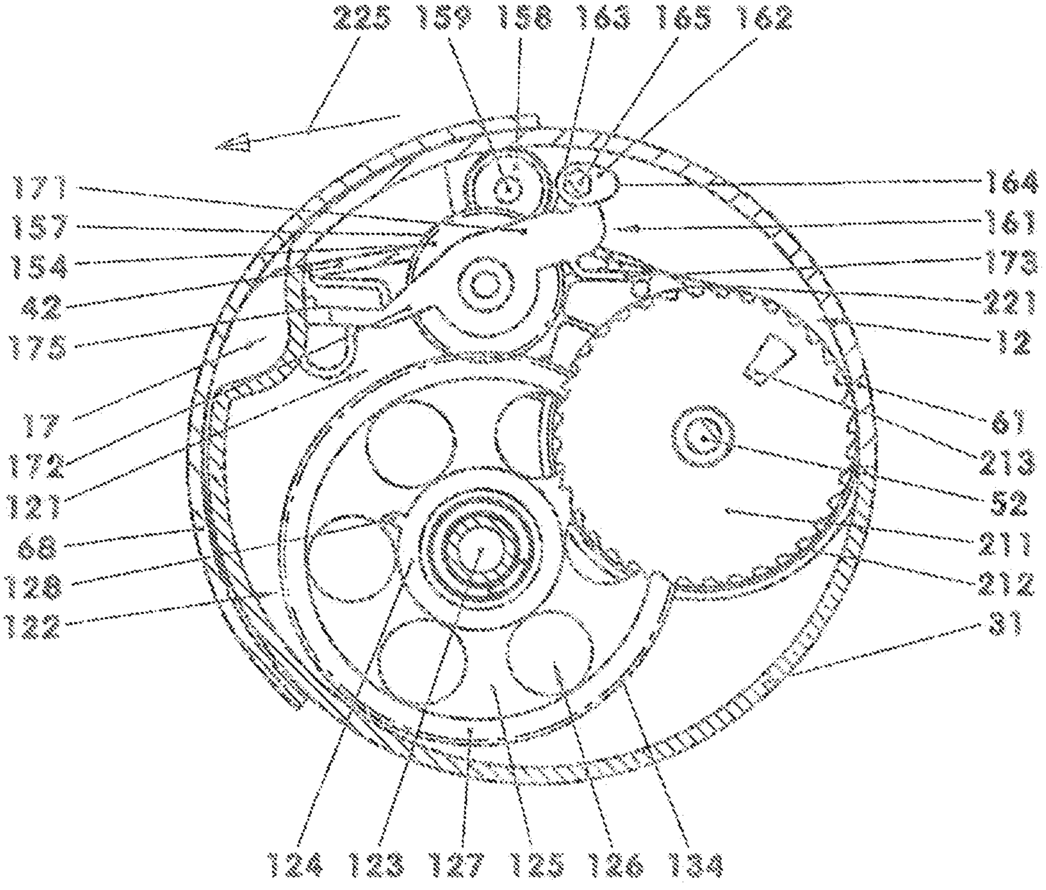
FIG. 2: cross section of the device from FIG. 1 below the cover.
Figure 3:
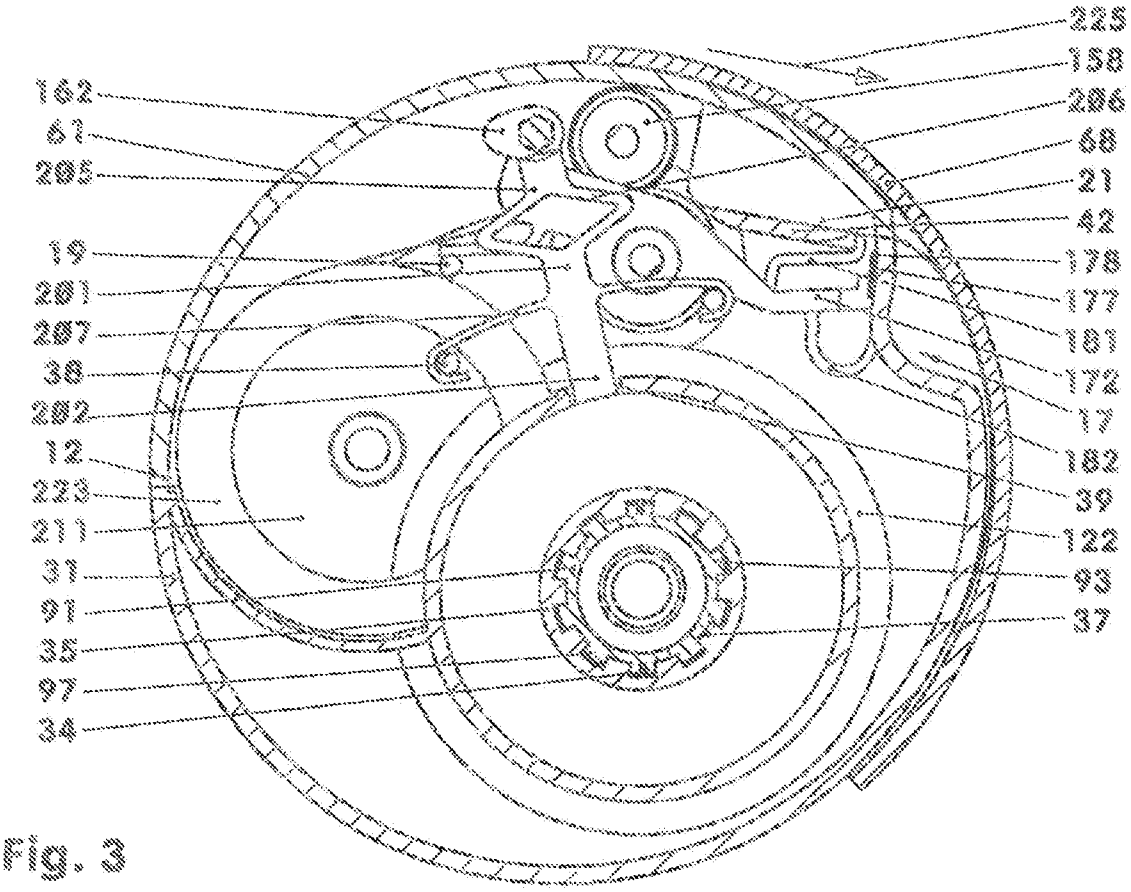
FIG. 3: cross section of the device from FIG. 1 above the base.
Figure 4:
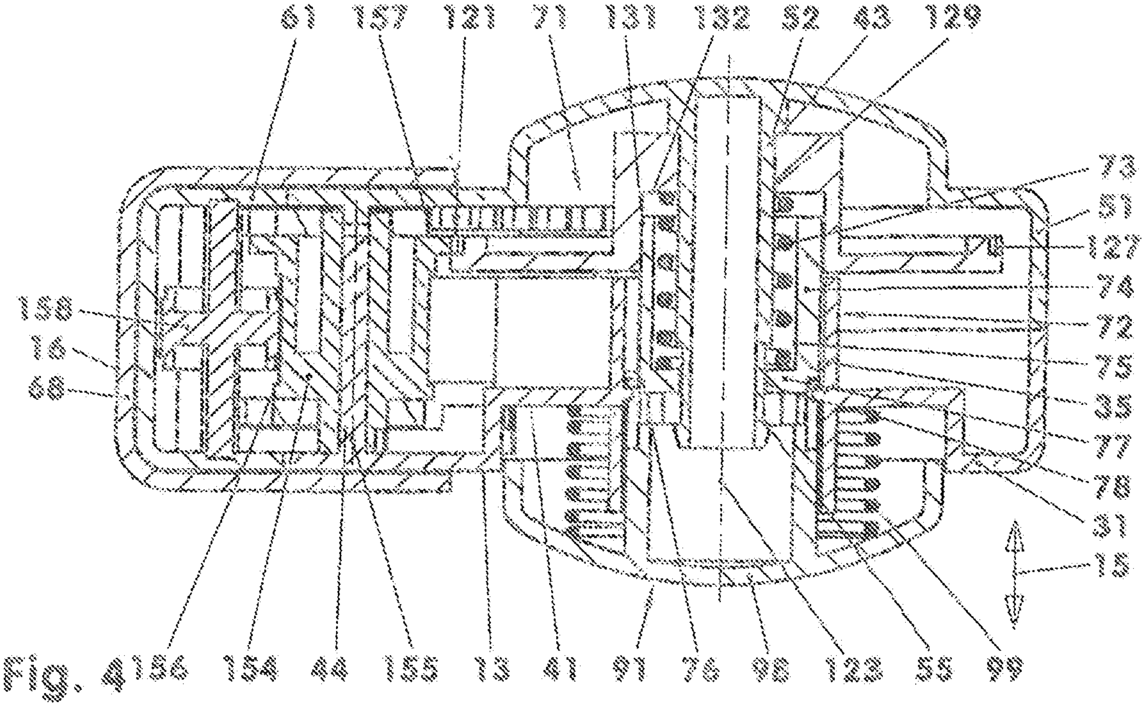
FIG. 4: longitudinal section of the device from FIG. 1 with a section plane spanned by the axis of the indexing coupling mechanism and the axis of the output roller.
Figure 5:
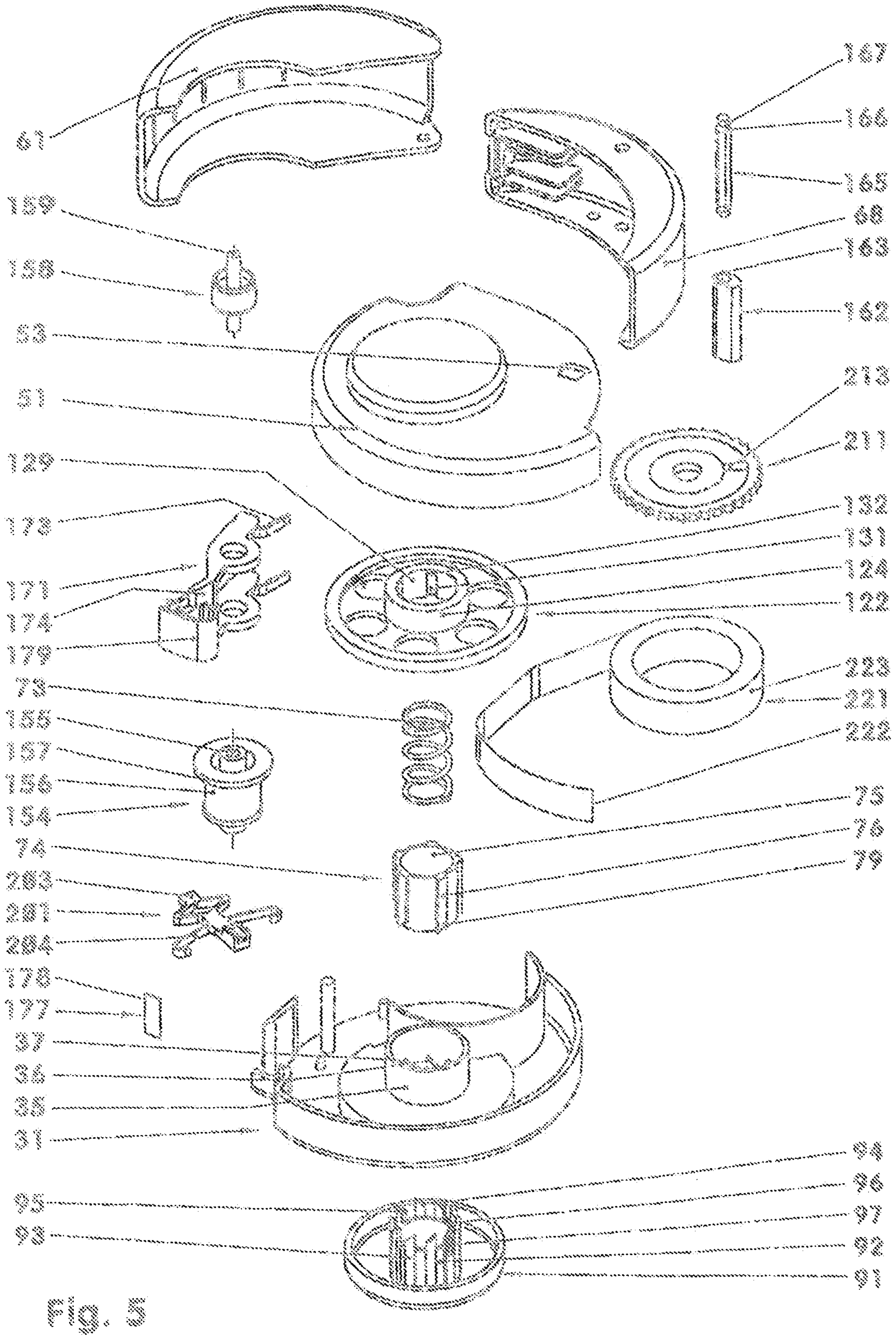
FIG. 5: exploded illustration of the device from FIG. 1.

An active ingredient-containing or active ingredient-carrying band (221) is stored in rolled-up form in the spool chamber (12) in the illustrations of FIGS. 2-4. Said band is for example a rolled-up oral active ingredient film, which has active pharmaceutical agents on its active ingredient-containing film layer. The strips generated from this are applied for example to the oral mucous membrane. It is also conceivable for the band (221) to be stored on a spool. Said spool may be mounted rotatably on a spool carrier which is fixed with respect to the housing. The band (221) has a constant cross section over its length. The free end (222) of the band (221) points in the direction of the discharge region (17). The band (221) is, in the spool chamber (12), protected against dust, moisture, UV light, other environmental influences and damage.

The drive device (71) comprises a wheel transmission (121) and an indexing coupling mechanism (72) positioned upstream thereof. The wheel transmission (121) has an output roller (154) which is mounted in the housing (11) and which is subjected to load by means of a pressure-exerting roller ( ). The pressure-exerting roller (158) may be spring-loaded in the direction of the output roller (154). Between the output roller (154) and the rotatably mounted pressure-exerting roller (158), the band (221) is guided in the conveying direction (225) in the direction of the discharge region (17). For this purpose, the output roller (154) has a rolling surface (156) of cylindrical form, the length of which rolling surface oriented in the longitudinal direction (15) corresponds to the length of the pressure-exerting roller (158). For example, said rolling surface protrudes slightly on both sides of the band (221). The pressure-exerting roller (158) may possibly be produced from an elastic material, for example rubber. The rolling surface (156) of the output roller (154) may also be produced from this material.

The output roller (154) has a second rolling region (157), which is arranged coaxially with respect to the rolling surface (156) and so as to be offset with respect thereto in the longitudinal direction (15). Said rolling region (157) is, in the exemplary embodiment, formed as a spur wheel toothing. The diameter of said rolling region is for example greater, by one third, than the diameter of the rolling surface (156). The toothing of the second rolling region (157) may be designed for example as a straight or helical toothing, as a worm wheel toothing, etc. The embodiment as a friction wheel is also conceivable.

In the wheel transmission (121), the output roller (154) is driven, at its rolling region (157), by means of a drive wheel (122). In the exemplary embodiment, the output roller (154) and the drive wheel (122) have mutually parallel axes (123, 155). The diameter of the drive wheel (122) is two and a half times as great as the diameter of the rolling region (157). During one rotation of the drive wheel (122), the output roller (154) thus rotates through 2.5 rotations. The drive wheel (122) has, in the exemplary embodiment, a toothing which meshes with the toothing of the rolling region (157). This transmission stage may also be formed as a friction wheel transmission stage, a bevel wheel transmission stage, as a worm and worm wheel, etc.

In the case of an embodiment as a friction wheel transmission, it is conceivable for the drive wheel (122) to roll on the rolling surface (156). The wheel transmission (121) is then, including the counterpressure roller (158), arranged in one common plane. In such an embodiment, all three axes (123, 155, 159) may be arranged along a common straight line. In the case of an embodiment as a friction wheel transmission, the output roller (154) may for example be movable in floating fashion along said straight line, such that the pressing force of the counterpressure roller (158) ensures both the contact between the drive wheel (122) and the output roller (154) and the pressing force between the output roller (154), the band (221) and the counterpressure roller (158).

The drive wheel (122) has a central hub (124), a web (125) with apertures (126), and an encircling rolling collar (127). The apertures (126) for reducing the moment of inertia are distributed uniformly in the web (125). The drive wheel (122) is mounted in an axial and radial direction for example on a housing journal (52) arranged in the housing top part (51).

On the outer side of the hub (124), there is arranged a driver (128), which is for example integrally formed on the hub (124). In the exemplary embodiment, the driver (128) is of hook-like form and protrudes approximately radially from the hub (124). In its longitudinal bore (129), the hub (124) has for example five driver grooves (131). These have a constant cross section over their length and are each delimited by means of a groove stop (132).

An indexing pinion (74) of an indexing coupling mechanism (72) positioned upstream of the wheel transmission (121) engages into the driver grooves (131). It is also conceivable for the driver grooves to be arranged on the indexing pinion (74), and for the drivers that engage into said driver grooves to be for example integrally formed on the drive wheel (122). The indexing coupling mechanism (72) furthermore comprises the indexing button (91) and an indexing spring (73). The indexing button (91), the indexing spring (73) and the indexing pinion (74) are arranged coaxially with respect to one another. The indexing spring (73) and the indexing pinion (74) are guided in the longitudinal direction (15) along the top shell housing journal (52). The stroke of the indexing pinion (74) in the longitudinal direction (15) is in this case limited by means of a recess (55) of the top shell housing journal (52).

The indexing pinion (74) is, in the exemplary embodiment, of pot-shaped form. It has an internally situated spring receptacle (75) and, for example, five externally situated indexing pegs (76). The spring receptacle (75) is of cylindrical form and has, at an end side, a support ring (77). Said support ring (77) has a central bore (78) which engages around the top shell housing journal (52). In the longitudinal direction (15), the length of the individual indexing peg (76) corresponds to the length of the indexing pinion (74). The cross section of the individual indexing peg (76) is constant over its length. All delimiting surfaces of the individual indexing peg (76) which are oriented normally with respect to the cross-sectional area are arranged parallel to the longitudinal direction (15). The thickness of the indexing pinion (74) in the region of the indexing peg (76) amounts to twice the thickness of the hub (124).

That section of the indexing peg (76) which is oriented in the direction of the housing top part (51) engages into the corresponding driver grooves (131) of the drive wheel (122). This shaft-hub connection is, in the exemplary embodiment, formed as a spline connection. It may however also be formed as a positively locking, axially movable coupling in the manner of construction of a polygonal profile, serrated profile, parallel key connection or some other rotationally rigid connection.

In the direction of the housing bottom part (31), the indexing pegs (76) are delimited by means of indexing surfaces (79). Each plane of each individual one of these indexing surfaces (79) encloses an angle of for example 45 degrees with a normal plane with respect to the longitudinal axis (15). In the exemplary embodiment, the individual indexing surface (79) is additionally inclined by an angle of 15 degrees, such that that delimitation of the indexing surface (79) which adjoins the envelope surface points further in the direction of the housing bottom part (31) than that delimitation of the indexing surface (79) which adjoins the cylindrical part. The indexing pinion (74) may however also be formed with indexing surfaces (79) whose radials are oriented parallel to a normal plane of the longitudinal direction (15).

In the spring receptacle (75) of the indexing pinion (74), there is arranged the indexing spring (73), which is supported in the hub (124) of the drive wheel (122). The spring element (73) that forms the indexing spring (73) is designed for example as a cylindrical helical spring in the structural form of a pressure spring. Said spring element has, over its length, a constant winding cross section and a constant wire thickness. It is also conceivable for the spring element (73) to be formed with a non-constant winding cross section and/or non-constant wire thickness, in order to realize for example a progressive or degressive spring characteristic curve. The use of a conical pressure spring (73) is also conceivable.

In the exemplary embodiment, the indexing pinion (74) forms, with the indexing button (91), a releasable positively locking indexing coupling. The indexing button (91) has for example ten indexing button guide webs (93) arranged along a guide cylinder (92). Each of these indexing button guide webs (93) has an indexing button guide surface (94) which is of complementary form with respect to an indexing surface (79) of the indexing pinion (74). Each indexing button guide surface (94) is delimited by a free surface (95) which is oriented in the longitudinal direction (15) and which is formed as a radial surface of the guide cylinder (92). The end surface (96), of ring-shaped form, of the triggering element (91) has an interrupted sawtooth profile.

The triggering element (91) furthermore has two mutually oppositely situated guide apertures (97) in which guide pins (34), which are for example fastened in the housing (11), are guided. Said guide pins prevent a rotation of the indexing button (91) relative to the housing (11) and prevent the indexing button (91) from being lost. In the housing (11), the indexing button (91) is guided along a bottom housing guide tube (35). The minimum stroke of the indexing button (91) in the longitudinal direction (15) corresponds, in the exemplary embodiment, to twice the width of the indexing button guide surface (94) thereof. This width of the indexing button guide surface (94) is the length, measured in the plan view, of the secant of the envelope surface in the region of the indexing button guide webs (93) in a normal plane with respect to the longitudinal axis (15). Depending on the angle enclosed by the indexing button guide surface (94) with a normal plane with respect to the longitudinal direction (15), the minimum stroke amounts to twice the stated width multiplied by the tangent of the angle between the indexing button guide surface (94) and the normal plane.

On the inner wall of the bottom housing guide tube (35) there are formed, for example, ten end abutment surfaces (36). In the exemplary embodiment, these are of complementary form with respect to the indexing surfaces (79). The end abutment surfaces (36) are end surfaces of guide tube ribs (37). In the assembled state, an indexing button guide web (93) is arranged in each case between two guide tube ribs (37).

It is also conceivable for the indexing surfaces (79) of the indexing pinion (74) to be designed to be wider than described above. For example, they may extend over a segment of 36 degrees and thus cover an indexing button guide surface (94) and an end abutment surface (36) of the guide tube (35).

On the base side, the indexing button (91) has an externally situated actuating head (98) with a for example convexly curved actuating surface. The indexing button (91) may additionally be sealed off against the housing (11) for example by means of a flexible seal element in order to prevent the ingress of contaminants. Said seal element may for example be of elastically deformable design. By means of the seal element and/or the resetting spring (99), for example a pressure spring, arranged between the housing bottom part (31) and the actuating head (98), the indexing button (91) can be reset into its initial position.

The driver (128) of the drive wheel (122) meshes with a detent wheel (211). Said detent wheel is mounted rotatably on the top shell (51) of the housing (11) on a pivot journal. During every full rotation of the drive wheel (122), the detent wheel (211) is rotated onward by one sawtooth-like detent catch (212). On the side facing toward the inner wall of the top shell (51), the detent wheel (211) has for example a colored, segment-like marking (213). The housing (11) has, in its top shell (51), a viewing window (53) through which the detent wheel (211) is visible. For example, the marking (213) forms a remaining quantity indicator. If said marking becomes visible, the band (221), or, in the case of a non-refillable device (10), the device (10), must be exchanged.

The band (221) which is wound as a spool (223) is mounted in a freely rotatable manner in the spool chamber (12). The spool (223) may also be arranged on a spool journal on the housing or on a spool carrier mounted in the housing (11). From the spool (223), the band (221) is guided between the output roller (154) and the pressure-exerting roller (158). The pressure-exerting roller (158) presses the band (221) against the output roller (154). As the output roller (154) illustrated in FIG. 2 rotates counterclockwise, the band (221) is conveyed in the conveying direction (225) in the direction of the discharge region (17).

The severing device (161) has a camshaft (162), a pivot frame (171) and a detent slide (201). The camshaft (162) is for example fixedly connected to the pivot shaft (165) of the protective flap (68) mounted pivotably in the housing (11). In the illustration in FIG. 2, when the protective flap (68) is opened, the camshaft (162) is pivoted clockwise. The pivot angle of the protective flap (68) from the closed position into the opened position is for example 90 degrees. The camshaft (162) has a cylinder-section-shaped region (163) and a cam tip region (164). It is also conceivable for the camshaft (162) to be formed only with a half cam. The half cam then connects the cylinder-section-shaped region (163) to the cam tip region (164) only on one side. It is also conceivable for the camshaft (162) to be formed with two regions which are offset with respect to one another in the longitudinal direction (15), and which are for example rotationally offset with respect to one another.

When the protective flap (68) is closed, the camshaft (162) bears with the cylinder-section-shaped region (163) against the detent slide (201) and against the pivot frame (171), or has a small spacing to these two components. The detent slide (201) has a slide section (202), a pressure spring region (203) and a flexural spring region (204). In the exemplary embodiment, said detent slide is mounted in the bottom shell (31) so as to be displaceable in a radial direction toward the centerline of the indexing coupling mechanism (72). The slide section (202) may be of wedge-shaped form at its free end. The detent slide (201) is adjustable linearly from the rest position illustrated in FIG. 3 into a blocking position. The pressure spring region (203) has an actuating bar (205) which is connected to webs (206) arranged in a rhombus shape. The flexural spring region (204) arranged transversely with respect thereto comprises two flexural webs (207), which engage for example around spring pegs (38) on the housing. The slide section (202), which is of bar-like form, is guided in an aperture (39) of the indexing button recess (41) of the housing (11).

During an opening of the protective flap (68), the camshaft (162) rolls along the detent slide (201) in the direction of the cam tip (164). The detent slide (201) is displaced in the direction of the blocking position. Here, both the webs (206) and the flexural spring region (204) are elastically deformed. The slide bar (202) is displaced into the indexing button recess (41) and, there, engages behind the actuating head (98) of the indexing button (91). The indexing button (91) is thus blocked in the non-actuated position when the protective flap (68) is open. If an axial displacement of the slide bar (202) is to be blocked, the elastically deformable regions of the detent slide (201) prevent damage to the device (10).

In the exemplary embodiment, the pivot frame (171) is of U-shaped form. It is mounted on the shaft of the output roller (154). For the purposes of mounting, it has two frame arms (172) which engage around the output roller (154) at its end sides. On the freely projecting ends of the frame arms (172), there is arranged in each case one resetting spring (173). These resetting springs (173), which are formed as flexural springs, support the rear end of the pivot frame in the conveying direction (225) on a support peg (19) on the housing. The free ends of the frame arms (172) bear for example against the camshaft (162) or have a small spacing thereto. That region of the camshaft (162) which is couplable to the pivot frame (171) may have a different angular position than that region of the camshaft (162) which couples to the detent slide (201).

The transverse web (174), which connects the two frame arms (172), of the pivot frame (174) comprises a blade holder (175) and a hold-down means (179). The blade holder (175) is composed for example of a rigid holder with a transversely situated receiving groove for receiving the cutting blade (177). The cutting edge (178), oriented transversely with respect to the conveying direction (225), points upward in the illustrations of FIGS. 2 and 3.

The hold-down means (179) has two mutually spaced-apart, elastically deformable hold-down means flexural springs (181, 182). These are oriented parallel to the cutting blade (177). Here, the first hold-down means flexural spring (181), which is situated at the rear in the conveying direction (225), has the same spacing to the cutting blade (177) as the second hold-down means flexural spring (182), which is situated at the front in the conveying direction (225). In the illustration of FIGS. 2 and 3, both hold-down means flexural springs (181, 182) are spaced apart from the band (221).

A band guide element (42) is arranged in the housing (11). Said band guide element is situated between the output roller (154) and the first hold-down means flexural spring (181). A counterholder (21) is arranged on that side of the band (221) which is averted from the hold-down means flexural springs (181, 182).

During the assembly of the device (10), it is for example the case that the detent wheel (211) is mounted into the top shell (51) of the housing (11) onto the pivot journal, such that the latter engages behind the detent wheel (211). The drive wheel (122) is pushed onto the top shell housing journal (52) for example as far as against the journal stop (43), such that said drive wheel is mounted so as to be freely rotatable. The pressure spring (73) is inserted into the hub (124) of the drive wheel (122). The indexing pinion (74) is mounted onto the pressure spring (73) such that the indexing pegs (76) project into the driver grooves (131) of the drive wheel (122). The support ring (77) is then seated in a captively retained manner in the journal recess (55).

The pressure-exerting roller (158) is inserted into the housing cap (61) of shell-like form. Furthermore, the camshaft (162) is pushed into the housing cap (61) and is secured by means of the spline shaft (165) which is pushed through the housing cap (61) and the camshaft (162). Said spline shaft (165) has two bearing regions (166), by means of which it is mounted in the housing cap (61). Outside the bearing regions (166), the spline shaft (165) has, for example, hexagonal pegs (167) which, after the insertion process, project out of the housing cap (61) on both sides. The protective flap (68) is mounted onto the outer side of the housing cap (61), such that the protective flap (68) engages in positively locking fashion around the hexagonal pegs (167).

For example, the indexing button (91) is firstly inserted, from the bottom side (13), into the bottom shell (31) of the housing (11). The detent slide (201) is pushed in at the inner side of the bottom shell (31). The output roller (154) and the cutting blade (177) are inserted into the pivot frame (171). This unit is subsequently pushed onto the bearing journal (44) of the housing bottom part (31). After the band (221) has been placed into the spool chamber (12), the free end (222) of said band is pulled at least into the region of the band guide element (42). It is also conceivable for the free end (222) to be pulled as far as into the region of the cutting blade (177) or as far as into the discharge region (17).

To close off the housing (11), it is for example firstly the case that the bottom shell (31) with the components arranged therein and the top shell (51) with the components arranged therein are joined together. The joining may be realized detachably, for example by means of a detent connection, or non-detachably, for example by means of an adhesive connection. The housing cap (61) with the components installed therein is subsequently joined to the assembly composed of the bottom shell (31) and the top shell (51). This joining connection may also be of detachable or non-detachable form.

The assembly of the individual subassemblies and of the device (10) as a whole may also be performed in a different sequence. It is also conceivable for individual components to be assigned to other subassemblies. For example, all of the gearing parts may be preassembled in the bottom shell (31), such that the top shell (51) forms a device cover. In the case of such a construction, the device (10) can be easily tested before being closed.

During use, the operator holds the device (10) illustrated in FIG. 1 in one hand. Here, it is for example the case that the top shell (51) points upward. The bottom shell (31) lies on the surface of the hand. The protective flap (68) is closed.

Figure 6:
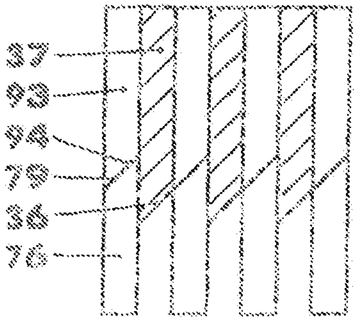
FIG. 6: schematic illustration of the indexing coupling mechanism from FIG. 4 in the basic position.

For the actuation, the operator presses the indexing button (91) relative to the housing (11) in the direction of the top shell (51). The indexing coupling mechanism (72) is actuated. The indexing button (91) displaces the indexing pinion (74) in the longitudinal direction (15) relative to the housing (11), counter to the force of the pressure spring (73). FIG. 6 shows the indexing coupling mechanism (72) schematically prior to the actuation. The guide tube ribs (37) are illustrated with hatching. The indexing button guide webs (93) are illustrated at the top, and the indexing pegs (76) of the indexing pinion (74) are illustrated at the bottom. The indexing surfaces (79) of the indexing pinion (74) bear against the indexing button guide surfaces (94). The end abutment surfaces (36) of the bottom housing guide tube (35) are aligned with the indexing button guide surfaces (94) situated adjacent thereto to the right. The indexing coupling mechanism (72) is secured in positively locking fashion.

Figure 7:
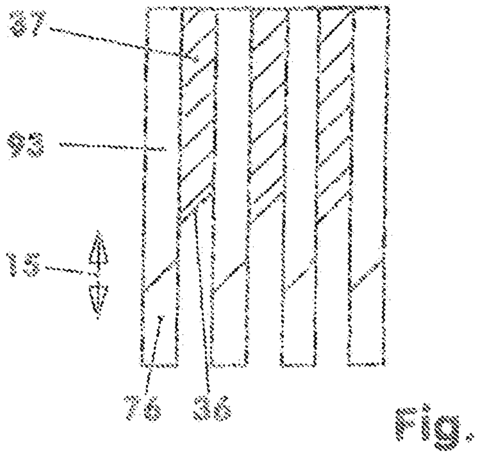
FIG. 7: schematic illustration of the indexing coupling mechanism from FIG. 4 with triggering element actuated.

During the actuation of the indexing button (91), the latter is displaced along the guide of the bottom housing guide tube (35) in the longitudinal direction (15). The indexing pegs (76), which initially bear against the guide tube ribs (37) of the bottom shell (31), are displaced relative to the bottom shell (31). FIG. 7 shows the indexing coupling mechanism with displaced indexing pinion (74). The indexing coupling mechanism (72) is decoupled. For ease of understanding, the indexing pegs (76) are illustrated as being clearly spaced apart from the guide tube ribs (37) in the longitudinal direction (15). It is however also conceivable for the stroke of the indexing button (91) to be limited such that, in the loaded position, the individual end abutment surface (36) of the bottom housing guide tube (35) is aligned with the indexing button guide surface (94) respectively situated adjacent thereto to the left.

The force of the indexing spring (73) acting on the indexing pinion (74) counter to the actuating direction of the triggering element (91) has a component which acts parallel to the indexing surface (79). This component causes a rotation of the indexing pinion (74) to the right in the illustration in FIG. 7. The indexing pinion (74) slides along the indexing button guide surface (94), wherein the pressure spring (73) is relaxed.

The rotating indexing pinion (74) drives the drive wheel (122) conjointly via the indexing pegs (76). In the illustration in FIG. 2, the drive wheel (122) rotates clockwise. The drive wheel (122) drives the output roller (154), which rotates counterclockwise. The output roller (154) pulls the band (221) out of the spool chamber (12), and conveys it in the direction of the discharge region (17), by means of the frictional contact pressure between the counterpressure roller (158) and the rolling surface (156).

Figure 8:
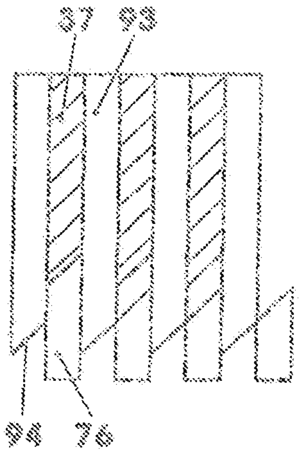
FIG. 8: schematic illustration of the indexing coupling mechanism from FIG. 4 with triggering element still actuated.

The indexing pinion (74) rotates until it bears against the next indexing button web (93), cf. FIG. 8. The indexing pinion (74) may possibly additionally abut against the end abutment surface (36) on the housing.

Figure 9:
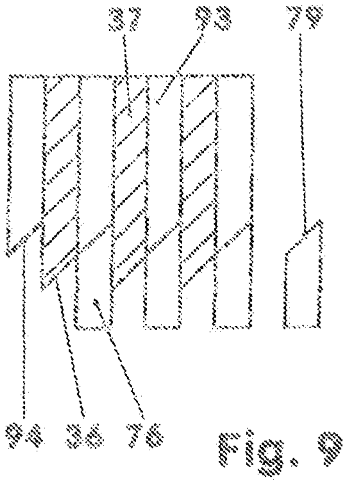
FIG. 9: schematic illustration of the indexing coupling mechanism from FIG. 4 after the release of the triggering element.

As soon as the operator releases the indexing button (91), the indexing button resetting spring (99) causes the indexing button (91) to move out relative to the housing (11). For example, the indexing button guide webs (93) are moved back into the initial position shown in FIG. 9.

The indexing surfaces (79) of the indexing pinion (74) then slide, under the load imparted by the relaxing pressure spring (73), along the abutment surface (36) and the indexing button guide surface (94) of the next indexing button guide web (93). Here, the indexing pinion (74) rotates the drive wheel (122) onward, which drive wheel furthermore, by means of the output roller (154), conveys the band (221). This rotational movement takes place until the individual indexing peg (76) abuts against the next guide tube ribs (37) in the direction of rotation. The indexing coupling mechanism (72) is now engaged again in positively locking fashion.

The operator can now raise the protective flap (68). Here, the indexing button (91) is locked by means of the detent slide (201), as described above. In the case of a device (10) without an indexing button resetting spring, the detent slide (201) may possibly push the indexing button (91) back into its initial position. The above-described final conveying step can be triggered with the pushing-in of the detent slide (201).

The camshaft (162) which is rotated during the opening of the protective flap (68) pivots the pivot frame (171) from the rest position illustrated in FIGS. 2 and 3 into a pivoted end position. Proceeding from the illustration of FIG. 2, the pivot frame (171) is pivoted clockwise. The hold-down means (179) pivots against the counterholder (21) and, by means of the hold-down means flexural springs (181, 182), holds the band (221) fixed. During the further pressing against the band (221), the cutting blade (177) severs the band (221). The severed active ingredient-containing or active ingredient-carrying strip is situated in the discharge region (17) and is held by the hold-down means (179). The operator can remove the strip by overcoming the force of the hold-down means (179) or after the protective flap (68) has been closed slightly.

The band (221) or the strip in the discharge region cannot be displaced back, because an opening of the protective flap (68) actuates the hold-down means (179) and the detent slide (201). The band (221) and the drive device (71) are blocked. Owing to the indexing coupling mechanism (72), the band (221) can be conveyed only in one direction.

After the removal of the strip and the closing of the protective flap (68), the band (221) can, after the actuation of the indexing button (91), be conveyed onward in the direction of the discharge region (17) in order for further strips to be removed. By means of the remaining quantity indicator (213), the fill level of the band can be monitored.

If appropriate, in the case of a detachably joined housing (11), after the band (221) has been consumed, a new band (221) can be inserted.

It is also conceivable for an active ingredient-containing or active ingredient-containing strip of relatively great length to be produced. The length of the strip then amounts to an integer multiple of the above-described length. To produce such a strip, the triggering element (91) is actuated multiple times before the protective flap (68) is open. The protective flap (68) may for example be of transparent form and have a scale. For this purpose, a dose unit indicator is connected to the drive device (71). It is thus possible, for example, for overdoses to be identified. Every time the triggering element (91) is pressed, the user is provided for example with an acoustic and haptic signal.

Figure 10:
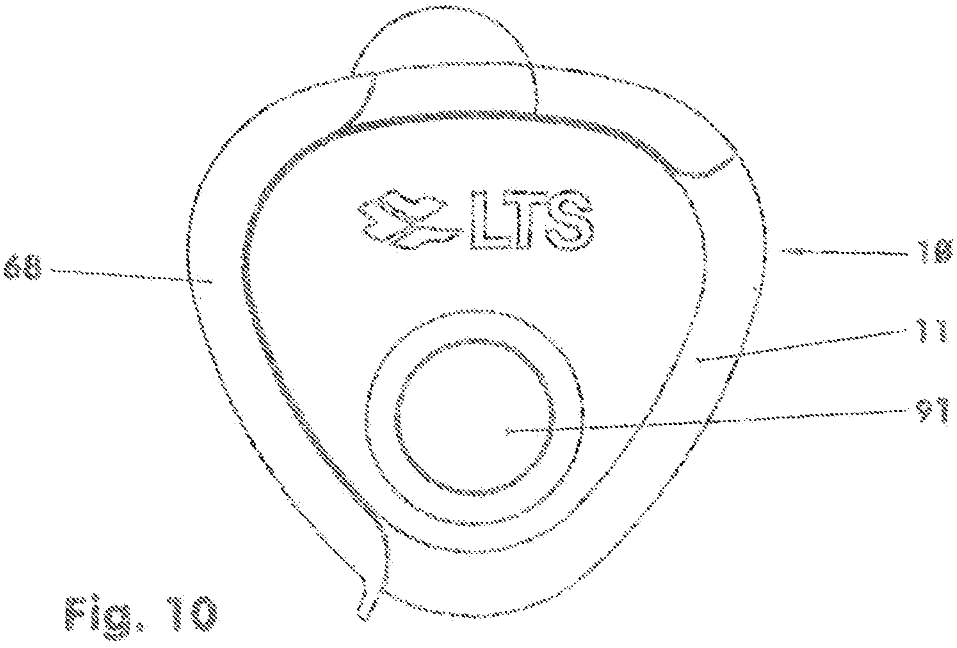
FIG. 10: further embodiment of a device for dispensing strips.

FIG. 10 shows a view from below of a further device (10). Said device has at least approximately the shape of an equilateral prism. The construction of the drive device (71) corresponds to the construction of the device (10) described in the first exemplary embodiment. In this device (10), too, the indexing button (91) is arranged on the bottom side (13) of the housing (11).

FIGS. 11-18 show a further embodiment of a device (10) for dispensing strips of an active ingredient-containing or active ingredient-carrying band (221). Said device (10) has a housing (11) in which a drive device (71), a spool chamber (12), a severing device (161) and a dosing device (231) are arranged. The housing (11) has a planar top side (14) and a bottom side (13) arranged parallel thereto. The longitudinal direction (15) will hereinafter be defined as the normal with respect to the top side (14) and with respect to the bottom side (13). The device (10) has a grip (22), a lever-like triggering element (91) and a discharge region (17), which is arranged on the end side and which is averted from the grip (22).

The drive device (71) has an indexing coupling mechanism (72) and a wheel transmission (121) connected downstream of the indexing coupling mechanism (72). The triggering lever (91) is mounted for example on a housing journal (32). The housing journal (32), which is formed integrally on the bottom shell (31), may be of cylindrical form, or may for example be formed with three steps. In the case of a stepped design of the housing journal (32), the triggering lever (91) is mounted for example on the uppermost step.

Figure 11:
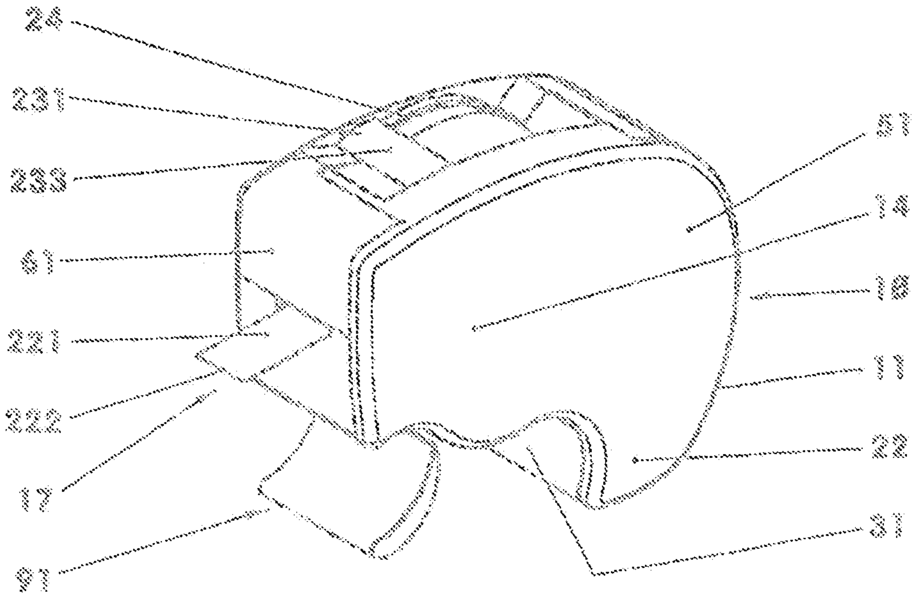
FIG. 11: isometric view of a device for dispensing strips with dosing device.
Figure 12:
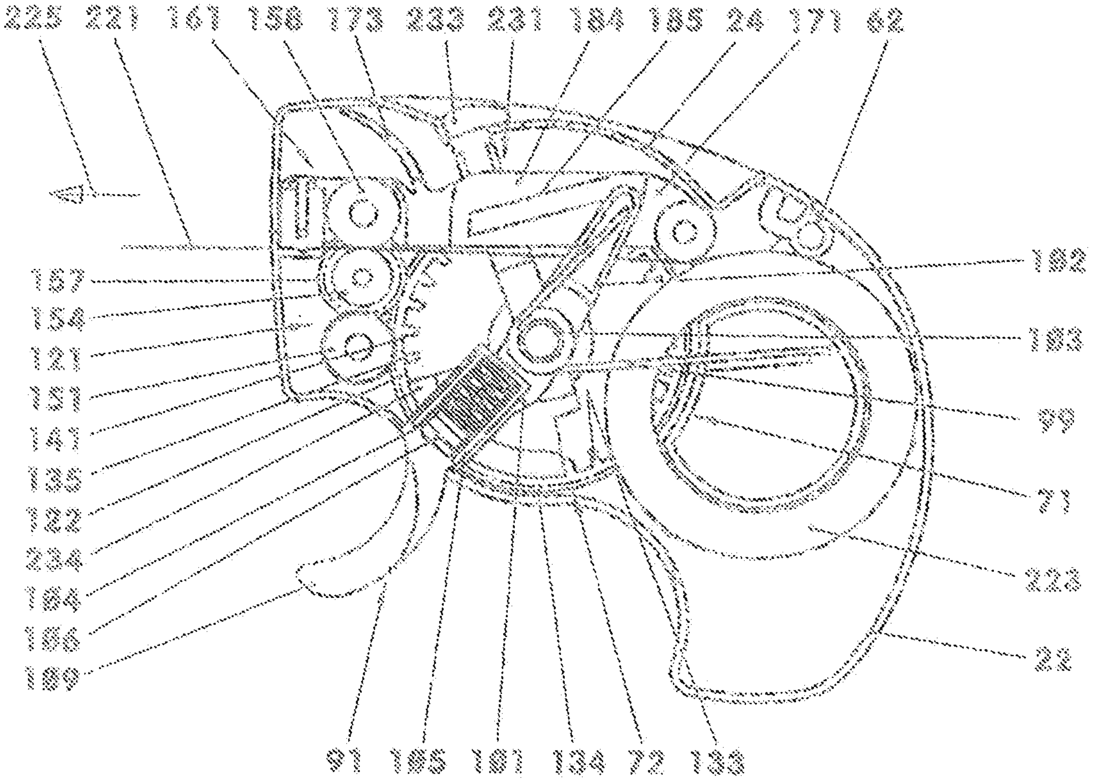
FIG. 12: device according to FIG. 11, with housing top part removed, in the basic position.
Figure 13:
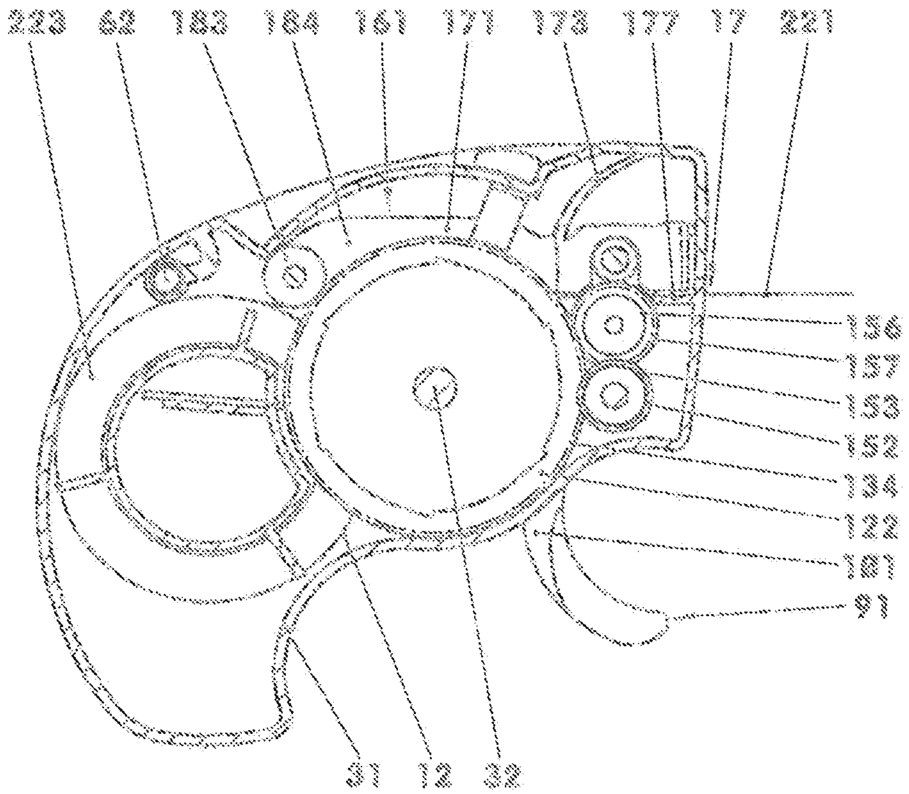
FIG. 13: cross section of the device from FIG. 11 above the base.
Figure 14:
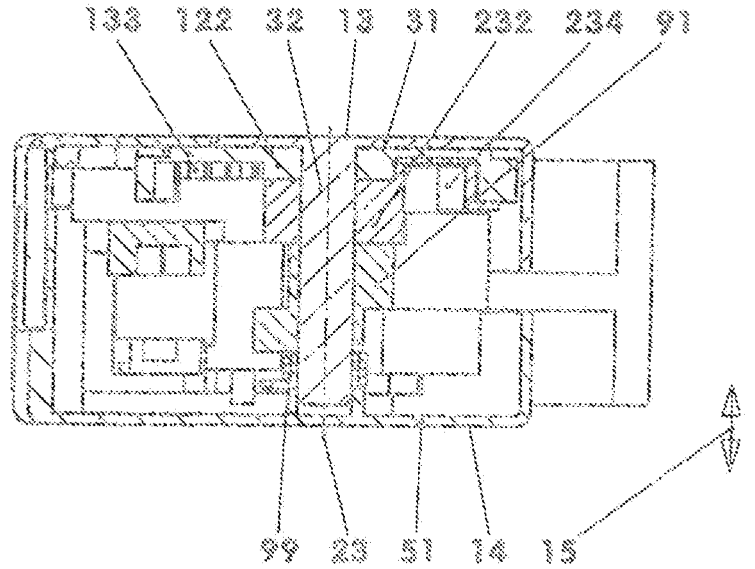
FIG. 14: longitudinal section of the device from FIG. 11 with a section plane through the axis of the indexing coupling mechanism and parallel to the conveying direction in the discharge region.
Figure 15:
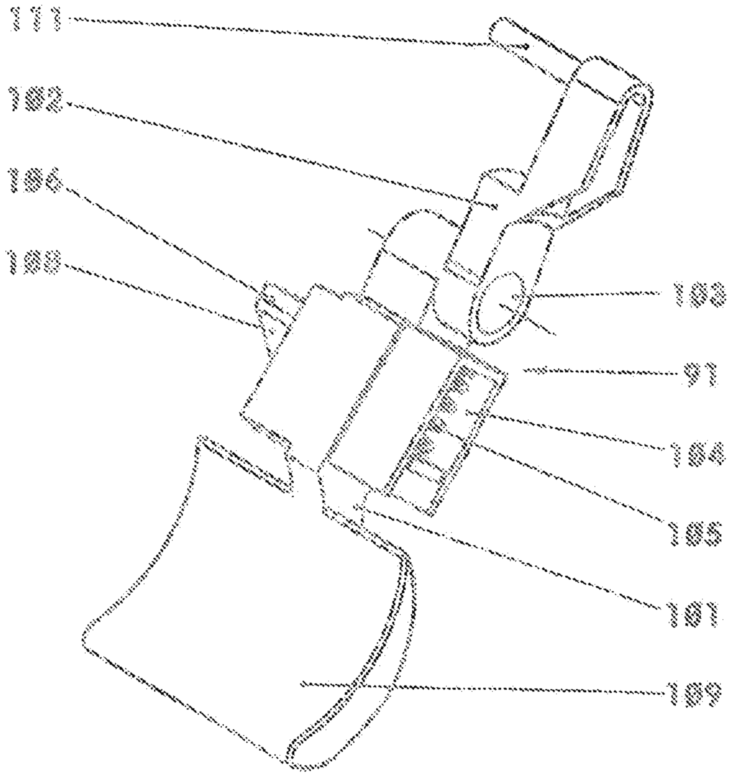
FIG. 15: isometric view of a triggering device.

The triggering lever (91) is pivotable, about a pivot axis (23) oriented in the longitudinal direction (15), from the rest position illustrated in FIGS. 11 to 13 into an actuated position. Here, a resetting spring (99), which is fixed in the housing (11) and to the triggering lever (91) and which is constructed for example in the manner of a torsion spring, is elastically deformed. The triggering lever (91) has a grip lever (101) and a blade holder lever (102), between which the pivot bearing (103) is arranged. In the exemplary embodiment, the outwardly projecting grip lever (101) has a length 1.9 times that of the blade holder lever (102) situated within the housing (11). The blade holder lever (102) and the grip lever (101) enclose an angle of 165 degrees in the illustration of FIG. 12.

The triggering lever (91) has, in the grip lever (101) within the housing (11), a detent guide (104) arranged radially with respect to the pivot axis (23). In said detent guide (104) there is arranged a pressure spring (105) which exerts load on a detent element (106) centrifugal with respect to the pivot axis (23). The detent element (106) is of wedge-shaped form and protrudes out of the triggering lever (91) in the direction of the housing bottom part (31). The wedge surface (108) is oriented away from the pivot axis (23) in the actuating direction of the triggering element (91).

At its free end which projects out of the housing (11), the grip lever (101) has a grip piece (109). The length of the grip piece (109) in the longitudinal direction (15) corresponds for example to the length of the housing (11) in this direction, reduced by two times the wall thickness. In the exemplary embodiment, the grip piece (109) is of shell-like form, wherein the bend line has been displaced, parallel to the longitudinal direction (15), relative to the grip piece (109) in the direction of the discharge region (17).

The blade holder lever (102) has a driver peg (111) which protrudes in the longitudinal direction (15) from the blade holder lever (102). Said driver peg (111) is coupled to a pivot frame (171) of the severing device (161).

In the illustration of FIG. 12, a dosing device (231) is arranged behind the triggering element (91). Said dosing device comprises a dosing lever (232), which is adjustable between the minimum position illustrated in this Figure and a maximum position. The dosing lever (232) is in this case mounted on the housing journal (32). In the case of a stepped design of the housing journal (32), the dosing lever (232) is mounted for example on the middle step. Said dosing lever is for example adjustable through a pivot angle of 63 degrees.

The dosing lever (232) has a dosing slide (233) which protrudes out of the housing (11) and which is for example adjustable along a detent rail (24) on the housing in stepped fashion, for example in six steps, from the minimum position into the maximum position. The dosing slide (233) may also be adjustable in continuously variable fashion. For example, it may have a releasable clamping device in order to arrest it at the desired position relative to the housing (11). Furthermore, the dosing device (231) may be designed such that the dosing slide (233) is first connected to the dosing lever (232) during the assembly process.

Figure 16:
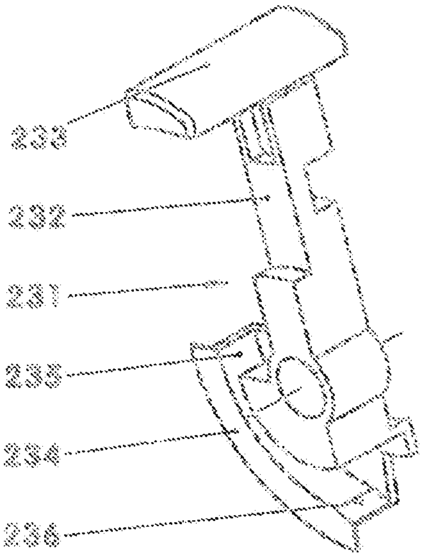
FIG. 16: isometric view of a dosing device.

At its end averted from the dosing slide (233), the dosing lever (232) has a guide shell (234). In the exemplary embodiment, the guide shell (234) covers a sector of 83 degrees, the central point of which is the pivot axis (23). In the non-actuated device (10), the guide shell (234) engages with a section (235), which is formed in the manner of a cylindrical shell, around the detent guide (104), such that the detent element (106) is supported on the guide shell (234). In the illustrations of FIGS. 12 and 16, the guide shell (234) has an insertion bevel (236) on the right-hand side.

Behind the dosing device (231) in the illustration of FIG. 12, the drive wheel (122) is arranged rotatably on the housing journal (32). In the case of a stepped design of the housing journal (32), the drive wheel (122) is mounted for example on the lowermost bearing step. The drive wheel (122) is, in the exemplary embodiment, a cylindrical wheel of pot-shaped form with an internal toothing (133) and with an external toothing (134).

Figure 17:
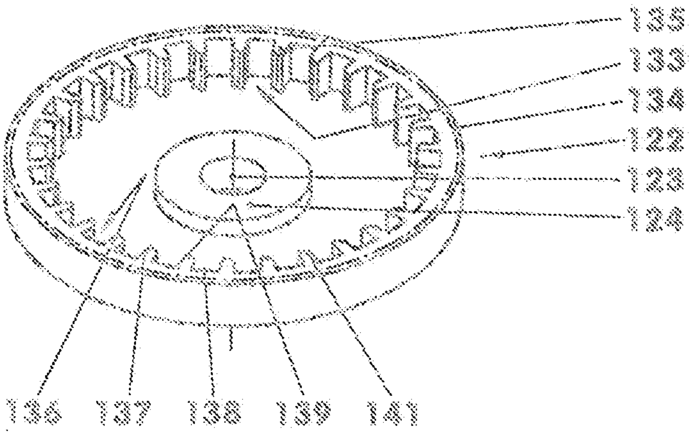
FIG. 17: isometric view of a drive wheel.

The internal toothing (133) is a driving toothing with for example 30 detent teeth (135). In each case two detent teeth (135) delimit a detent tooth space (136) with detent tooth flanks (137) lying parallel to one another. The groove base (138) is of concavely curved form. In the illustrations of FIGS. 12 and 17, the detent teeth (135) each have, on the right-hand side, an insertion bevel (141) adjoining the detent tooth tip (139). The spacing of the detent tooth flanks (137) to one another is for example slightly greater than the width of the detent element (106) of the triggering lever (91). The diameter of the tip circle delimited by the detent tooth tips (139) is greater, by a few tenths of a millimeter, than twice the radius of the shell surface of the guide shell (234). In the exemplary embodiment, the normal plane, oriented in the longitudinal direction (15), in the center of a groove base (138) encloses an angle of two degrees with a radial plane. In the illustration of FIG. 12, this angle is oriented to the right. The groove base (138) may also be formed coaxially with respect to the axis of rotation, oriented in the longitudinal direction (15), of the drive wheel (122). The detent tooth flanks (137) which delimit the detent tooth spaces (136) are then for example formed parallel to said radial plane.

The external toothing (134) of the drive wheel (122) is an involute toothing (134). It may be of straight or helical form. By means of this involute toothing (134), the drive wheel (122) meshes with an intermediate wheel (151), which is mounted in the housing (11) and which has a toothing of the same modulus. The intermediate wheel (151) of the wheel transmission (121), which is composed of three wheels (122, 151, 154) and which is formed as a rolling-contact transmission, has, in the exemplary embodiment, two toothings (152, 153) offset with respect to one another. The second toothing (153) is coupled to the output roller (154). In the exemplary embodiments, the two toothings (152, 153) have the same pitch circle and, for example, equal moduli, such that the envelope contour of the intermediate wheel (151) is a cylindrical shell surface. It is also conceivable for the entire rolling-contact transmission (121) to be arranged in one transmission plane. The toothing (152; 153) of the intermediate wheel (151) then meshes both with the drive wheel (122) and with the toothing of the output roller (154). It is also conceivable for the toothings (152, 153) of the intermediate wheel (151) to be designed with different pitch circles and/or with different moduli.

The output roller (154) and the pressure-exerting roller (158) in this exemplary embodiment are designed as described in conjunction with the first exemplary embodiment.

The severing device (161) comprises a pivot frame (171), which is mounted pivotably in the housing (11) and in which a hold-down means (179) and a severing tool (177) are held. The pivot frame (171) has a pivot hub (183) which, in the installed state, engages around a pivot journal on the housing, which pivot journal is oriented in the longitudinal direction (15). A pivot web (184) oriented radially with respect to the longitudinal direction (15) points in the direction of the discharge region (17). In the illustrations of FIGS. 12 and 13, the pivot web (184) engages around the pressure-exerting roller (158). The pivot web (184) has a guide slot (185) which receives the driver peg (111) of the triggering lever (91). The guide slot (185), which is for example stamped in, has four sections (186-189), which together form a polygon. A first stroke section (186), which is for example of wedge-shaped form, has a constant depth. Said section encloses, for example with the stated radial with respect to the pivot hub (183), an angle, averted from the pivot hub (183), of 15 degrees, cf. FIGS. 12 to 18. In the basic position, the driver peg (111) is seated at the apex of this angle. The stroke section (186) is for example of open form at its bottom side, cf. FIG. 18.

At the end averted from the apex, the stroke section (186) is adjoined by a free-running section (187). Said section (187), which is for example of arcuate form, is formed concentrically with respect to the pivot hub (183) and, in the illustrations of FIGS. 12 and 18, leads upward. It is however also conceivable for the free-running section (187) to be formed as a broad, for example straight groove. The depth of the free-running section (187) corresponds to the depth of the stroke section (186), though may also be configured to be deeper.

Figure 18:
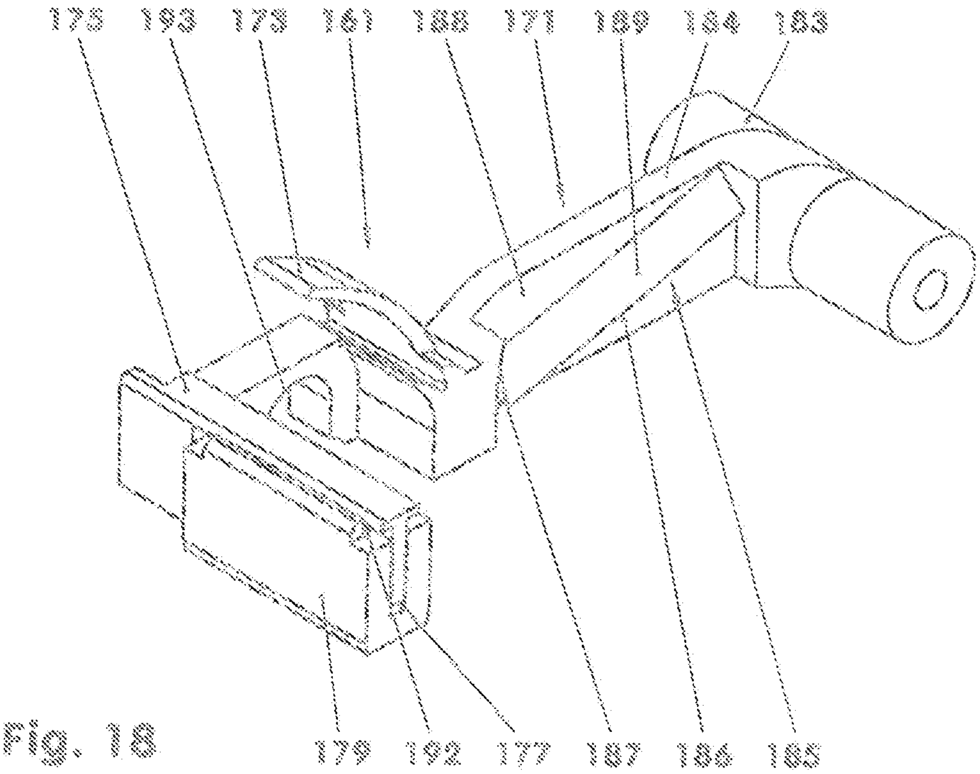
FIG. 18: isometric view of a severing device.

The free-running section (187) is adjoined by a return stroke section (188), which has for example the same depth as the stroke section (186) and the free-running section (187). In the illustrations of FIGS. 12 and 18, the pivot web (184) is designed to be upwardly open in the region of the return stroke section (188).

The fourth section (189) is a guide section (189) which is for example of wedge-shaped form, and which, at least in the region of the apex, connects the return stroke section (188) to the stroke section (186). For example, the slot base rises in the guide section (189) from the return stroke section (188) in the direction of the stroke section (186). The guide section (189) may also be designed to be narrower than illustrated. Some other configuration of the guide slot (185) is also conceivable.

The pivot frame (171) has a return pivot spring (173). The latter is formed for example as a cantilevered leaf spring and integrated into the pivot frame (171). It is supported on the inner wall of the housing (11). In the illustration in FIG. 12, the return pivot spring (173) exerts load on the pivot frame (171) counterclockwise.

The severing tool (177) is arranged on that side of the pivot frame (171) which faces toward the discharge region (17). The severing tool (177) is a cutting blade (177) which is oriented in the longitudinal direction (15) and transversely with respect to the conveying direction (225). In the illustrations of FIGS. 12 and 18, it projects downwardly out of the pivot frame (171).

The cutting blade (177) is surrounded by a hold-down means (179), which is arranged in spring-loaded fashion in the pivot frame (171). The hold-down means (179) is a rectangular frame which is arranged in the longitudinal direction (15) and transversely with respect to the conveying direction (225) and which is mounted displaceably in the pivot frame (171). In the illustrations of FIGS. 12 and 13, the hold-down means (179) is displaceable in a vertical direction parallel to the cutting blade (177). Here, said hold-down means is subjected to load by means of a leaf spring (192) arranged in the pivot frame (171).

In this exemplary embodiment, too, an active ingredient-carrying or active ingredient-containing band (221) is arranged in the spool chamber (12) of the housing (11). Said band is for example configured in the same way as the band (221) described in conjunction with the first exemplary embodiment.

The housing (11) has a housing bottom part (31), a housing cover (51) and, formed so as to be pivotable relative to these, a housing cap (61). The housing bottom part (31) is of trough-like form. It bears, on its inner wall, all of the rotary journals for the wheel transmission (121) and the housing journal (32) for the indexing coupling mechanism (72).

During the assembly of the device (10), it is for example firstly the case that the housing cap (61) is inserted into the bottom shell (31), such that the two parts are pivotable relative to one another about a pivot journal (62). The housing cap (61) and the housing bottom part (31) may also be formed in one piece. The drive wheel (122) is inserted into the bottom shell (31), wherein the detent teeth (135), in the illustration of FIG. 12, point upward. Then, the dosing device (231) is mounted onto the housing journal (32), such that the molded shell (234) is situated in the drive wheel (122) and the dosing lever (232) bears against the housing (11). The intermediate wheel (151) and the output roller (154) are mounted onto further housing journals, and are if necessary secured against displacement in the longitudinal direction (15). The pressure-exerting roller (158) is mounted into the housing cap (61). Said pressure-exerting roller may be spring-loaded in the direction of the axis of rotation of the output roller (154). Furthermore, the pivot frame (171) is inserted with the hold-down means (179) and the cutting blade (177) into the housing cap (61).

For example, after the insertion of the band (221) into the spool chamber (12), the band (221) is led into the region of the output roller (154). After the insertion, it is for example the case that the free end (122) of the band (112) is clamped between the output roller (154) and the pressure-exerting roller (158).

The triggering lever (91) is mounted onto the housing journal (32), and the resetting spring (99) is engaged both on the housing (11) and on the triggering lever (91). After the assembly process, the driver peg (111) of the triggering lever (91) lies in the stroke section (186) of the slotted guide (185). The grip piece (109) projects outward. In this state, it is for example possible for the function of the dispenser device (10) to be tested. To complete the assembly process, the housing cover (51) is mounted. Some other sequence of the assembly process is also conceivable.

During the use of the device (10), the operator grips the housing (11) by the grip (22) and places a finger on the grip piece (109) of the triggering element (91). During the triggering, the grip piece (109) is moved to the right in the illustration of FIG. 12, and in the process is pivoted about the housing journal (32). The resetting spring (99) is placed under stress. The detent element (106) slides along the guide shell (234). As soon as the detent element (106) has departed from the right-hand end of the guide shell (234) in FIG. 12, said detent element engages, under load exerted by the pressure spring (105), in positively locking fashion into a detent tooth space (136) of the drive wheel (122). The indexing coupling mechanism (72) is now engaged. During the further actuation of the triggering element (91), the drive wheel (122) is driven along. The drive wheel (122) drives, via the intermediate wheel (151), the output roller (154), which conveys the band (221) in the conveying direction (225). The conveying takes place until the triggering lever (91) abuts against, for example, a stop on the housing.

During the movement of the triggering lever (91), the driver peg (111) is moved along the stroke section (186) of the slotted guide (185) from right to left in the illustration of FIG. 12. The pivot frame (171) is raised, wherein the return pivot spring (173) is subjected to load. As soon as the triggering lever (91) bears against the stop on the housing, the driver peg (111) is situated in the free-running section (187). The pivot frame (171), accelerated by the return pivot spring (173), is pivoted back into the initial position. Here, the hold-down means (179) impinges on the band (221) and secures the position of the band (221) against the counter-holder (21). During the deformation of the hold-down means spring (192), the cutting blade (177) impinges on the band (221) and severs the latter. The severed section is situated in the discharge region (17), and is held by the hold-down means (179).

After the grip piece (109) is released, the triggering lever (91) is moved by means of the relaxing resetting spring (99) back in the direction of the initial position illustrated in FIG. 12. Here, the wedge surface (108) of the detent element (106) slides into the guide shell (234) along the insertion bevel (236) of the guide shell (234). The indexing coupling mechanism (72) is decoupled. The driver peg (111) travels into the return stroke section (188) and from the latter into the guide section (189). In the latter section (189), the triggering lever (91) is for example elastically deformed in the direction of the housing cover (51), such that the driver peg (111), at the apex, engages into the stroke section (186) again. The triggering lever (91) is then in the initial position again. After the strip that has already been cut off has been removed, the band (221) can be conveyed in order to produce further strips.

If a relatively large drug dose is required, it is for example possible for a relatively long active ingredient-containing or active ingredient-carrying strip to be produced. For this purpose, the dosing slide (233) is, in the illustrations of FIGS. 11 and 12, displaced along the detent rail (24) for example to the right, and locks with detent action in the housing (11). Here, the guide shell (234) is, in the illustration of FIG. 12, pivoted clockwise about the housing journal (32).

When the triggering lever (91) is actuated, the detent element (106) engages into the drive wheel (122) already after traveling through a relatively small sector. The drive wheel (122) is rotated through a greater angle of rotation before the triggering lever (91) reaches the housing stop than in the example described above. The length of the conveyed band (221) and of the produced strip is proportional to this angle of rotation of the drive wheel (122). The maximum dose of the strip can thus be set, such that an overdose is prevented.

If it is sought to place a new band (221) into the device (10), it is for example the case that the housing cover (51) is removed, and the resetting spring (99) is removed. After the new spool has been inserted into the spool chamber (12), it is for example possible for the housing cap (61) to be pivoted open in order to thread the new band (221) in.

Figure 19:
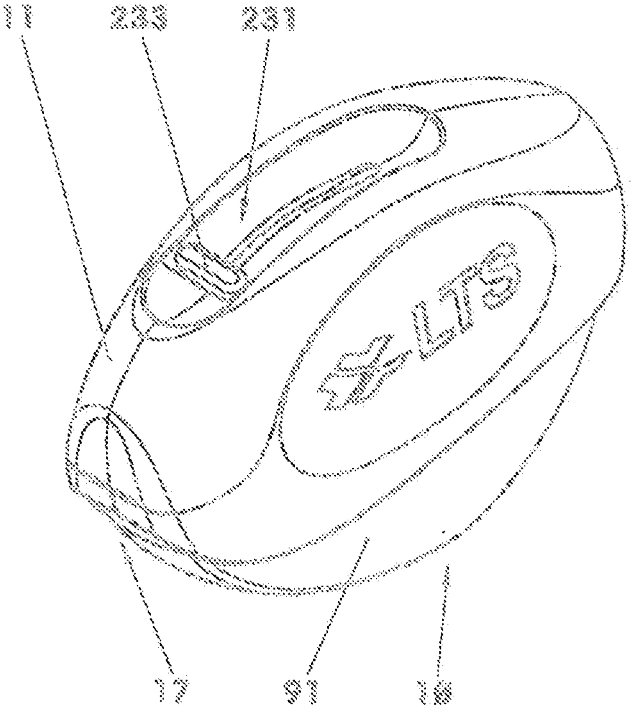
FIG. 19: isometric view of an alternative embodiment of a device for dispensing strips with dosing device.
Figure 20:
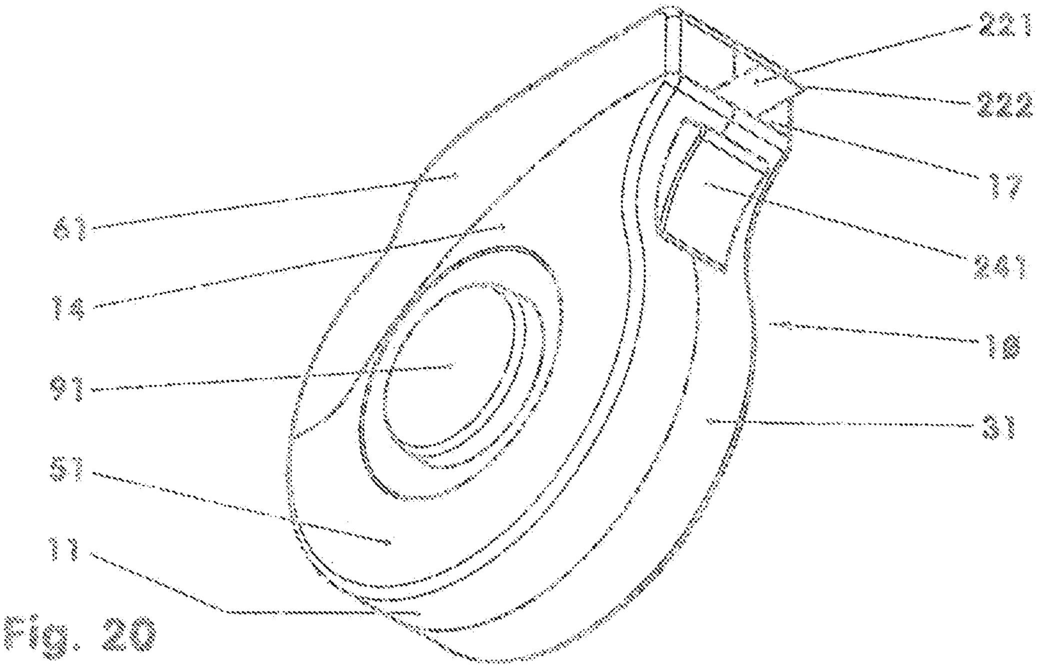
FIG. 20: isometric illustration of a device for dispensing strips with rotatable triggering element.

FIG. 19 illustrates a further variant of a device (10) of said type. The triggering element (91) is designed as a large-area indexing button (91) which is arranged laterally on the housing (10). The dosing slide (233) is arranged opposite the triggering element (91). The internal construction and the function of this device (10) correspond to the construction and function of the device (10) described in the exemplary embodiment of FIGS. 11-18.

FIGS. 20-26 show a further device (10) for dispensing strips which are produced from an active ingredient-containing or active ingredient-carrying band (221). In this example, the housing (11) is composed of a bottom shell (31), of a housing cover (51) and of a two-part housing cap (61). A triggering element (91) is arranged on the top side (14), and a covering cap (18) is arranged on the bottom side (13). The triggering element (91), which is designed as a rotary knob (91), may for example have grip depressions. Furthermore, the device (10) has a rocker button (241) which is actuated in order to sever a strip. In this exemplary embodiment, too, the longitudinal direction (15) is defined as being normal to the top side (14) and to the bottom side (13).

In the housing (11), as drive device (71), there are arranged an indexing coupling mechanism (72) and a wheel transmission (121). The indexing coupling mechanism (72) driven by means of the triggering element (91) drives the wheel transmission (121). The wheel transmission (121) conveys the band (221) out of the spool chamber (12) in the direction of the discharge region (17). After actuation of the rocker button (241), a strip severed from the band (221) can be removed. Also visible on the housing (11) is an indicator (252) which indicates for example the number of units of the band (221) that have been conveyed since the last severing operation.

The rotary knob (91) is mounted rotatably in the housing (11). Said rotary knob has, for example, four driver lugs (113) which engage into and behind a hub (124) of a drive wheel (122). The drive wheel (122) itself is coupled by means of driver pegs (142) to a ratchet wheel (81) of pot-shaped form. The ratchet wheel (81) is displaceable relative to the drive wheel (122) in the longitudinal direction (15). For this purpose, the ratchet wheel (81) has driver grooves (84) into which the driver pegs (142) of the drive wheel (122) engage. Said ratchet wheel has, on its base (83) averted from the rotary knob (91), an encircling sawtooth toothing (82) which engages into a corresponding counterpart toothing (45) of the bottom shell (31). Between the base (83) of the ratchet wheel (81) and the drive wheel (122), there is arranged an indexing spring (73) in the structural form of a pressure spring (73), such that the two components are always pushed apart from one another. An axial mounting of the rotary knob (91) in the housing (11) secures the position of the drive wheel (122) in the longitudinal direction (15).

When the rotary knob (91) is rotated counterclockwise about an axis of rotation oriented in the longitudinal direction (15), the drive wheel (122) and the ratchet wheel (81) are driven along. The pressure spring (73) presses the ratchet wheel (81) against the counterpart toothing (45) of the bottom shell (31), such that the ratchet wheel (81) is displaced back and forth in the longitudinal direction (15). Here, the ratchet wheel (81) is moved from a stable position, in which it is coupled in positively locking fashion to the bottom shell (31) and locked with detent action, into a labile position. If the rotary knob (91) is released, the ratchet wheel (81), the drive wheel (122) and the rotary knob (91) rotate back into the initial position. Only after the ridge of the sawtooth toothing (45, 82) has been overcome is the indexing coupling mechanism (72) indexed. The ratchet wheel (81) engages in positively locking fashion with detent action into the next detent catch of the counterpart toothing (45). The indexing coupling mechanism (72) is thus advanced in stepwise fashion.

If appropriate, the device may also be actuated from the bottom side (13) of the housing (11). In this case, by way of example, the covering cap (18) is formed as a rotary knob and is connected by means of a rotationally rigid coupling to the other components of the indexing coupling mechanism (72). For the actuation of the indexing coupling mechanism (72), the covering cap (18) is then rotated clockwise.

The drive wheel (122) has for example an external spur gear toothing (134), which, in a wheel transmission (121), is coupled by means of an intermediate wheel (151) to the output roller (154). The intermediate wheel (151), the output roller (154) and the toothings may be designed as described in conjunction with the preceding exemplary embodiments. The use of a friction wheel transmission is also conceivable.

The device (10) may also be designed without an intermediate wheel (151). For example, it is then the case that the sawtooth toothings (45, 82) of the ratchet wheel (81) and of the housing bottom part (31) point in the respective other direction. In the case of such an embodiment, a rotation of the rotary knob (91) clockwise causes the band (221) to be conveyed in the conveying direction (225).

A counterpressure roller (158) is arranged in the housing cap (61) of the housing (11). Said counterpressure roller is for example designed in the same way as the counterpressure roller (158) described in conjunction with the preceding exemplary embodiments.

The severing device (161) has a pivot frame (171) which is of L-shaped form in a plan view, which pivot frame bears a hold-down means (179) and a severing tool (177). The hold-down means (179) and the severing tool (177) are for example designed as described in conjunction with the exemplary embodiment illustrated in FIGS. 11 to 18.

Figure 26:
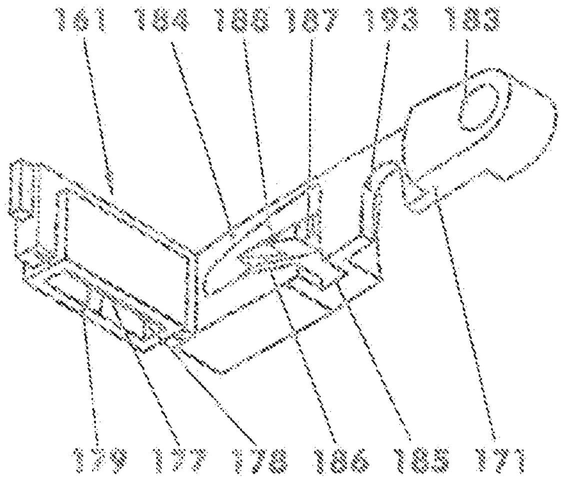
FIG. 26: isometric view of a severing device.

The pivot frame (171), which is illustrated in FIG. 26 in an isometric view from below, has a pivot hub (183) for receiving a pivot journal (62) on the housing and has a cutout (193) for engaging around the counterpressure roller (158). On the inner side, the pivot frame (171) has a guide slot (185). Said guide slot is for example designed similarly to the guide slot (185) described in conjunction with FIG. 18. The apex position is, in this illustration, situated at the left-hand end of the guide slot (185). The stroke section (186), the free-running section (187) and the return stroke section (188) are of groove-like form. The guide section (189) is of ramp-like form. The pivot frame (171) is loaded in the direction of a severing position by means of a return pivot spring (173) in the structural form of a torsion spring. In the illustration in FIG. 22, the pivot frame (171) is covered by a guide element (63) of the housing (11).

The rocker button (241) is mounted pivotably in the housing (11). Said rocker button forms the actuating element of the severing device (161). The rocker button (241) is of lever-like form. On one side of the pivot axis (242), said rocker button has a rocker stop (243), which limits the pivot angle of the rocker button (241) relative to the housing (11).

The rocker button (241) has a grip region (244) which protrudes out of the housing (11) at the discharge side (17). By pushing the grip region (244) in the direction of the housing (11), the operator can move the rocker button (241) from a rest position into an operational position. Furthermore, a resetting spring can return the rocker button (241) from the operational position into the rest position.

Figure 21:
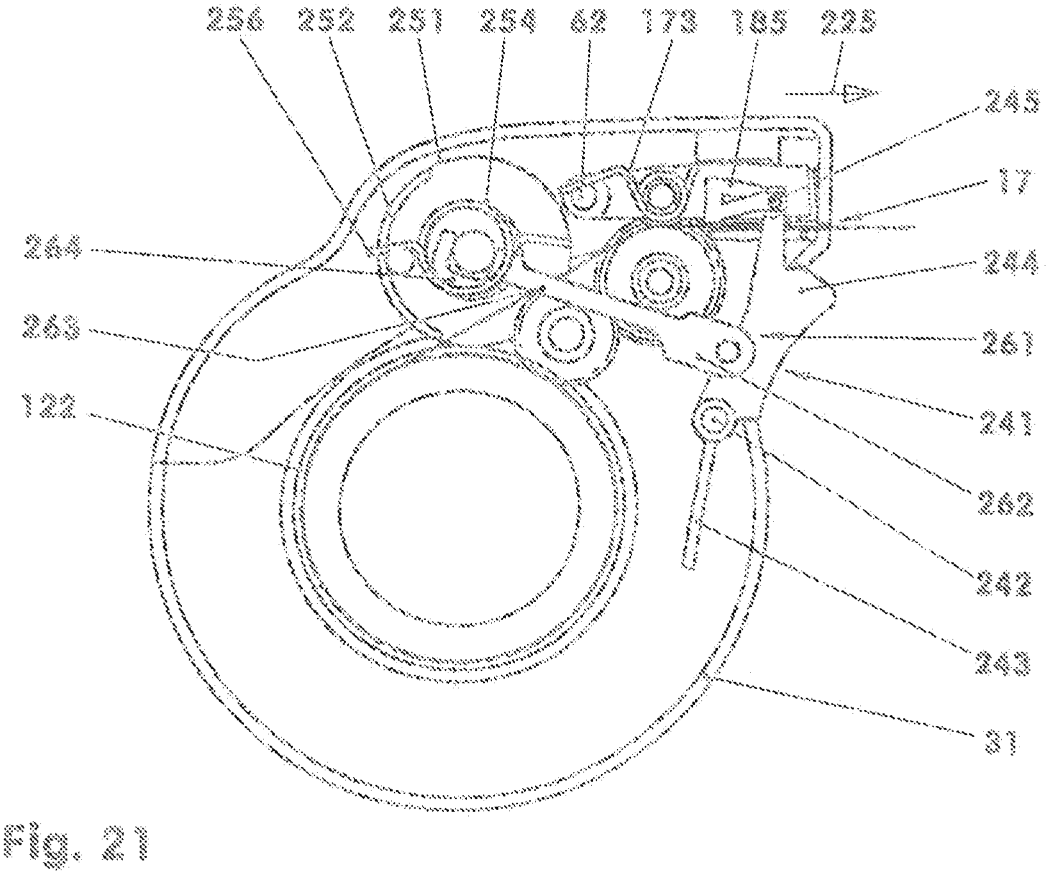
FIG. 21: plan view of the device from FIG. 20 with housing top part removed.
Figure 22:
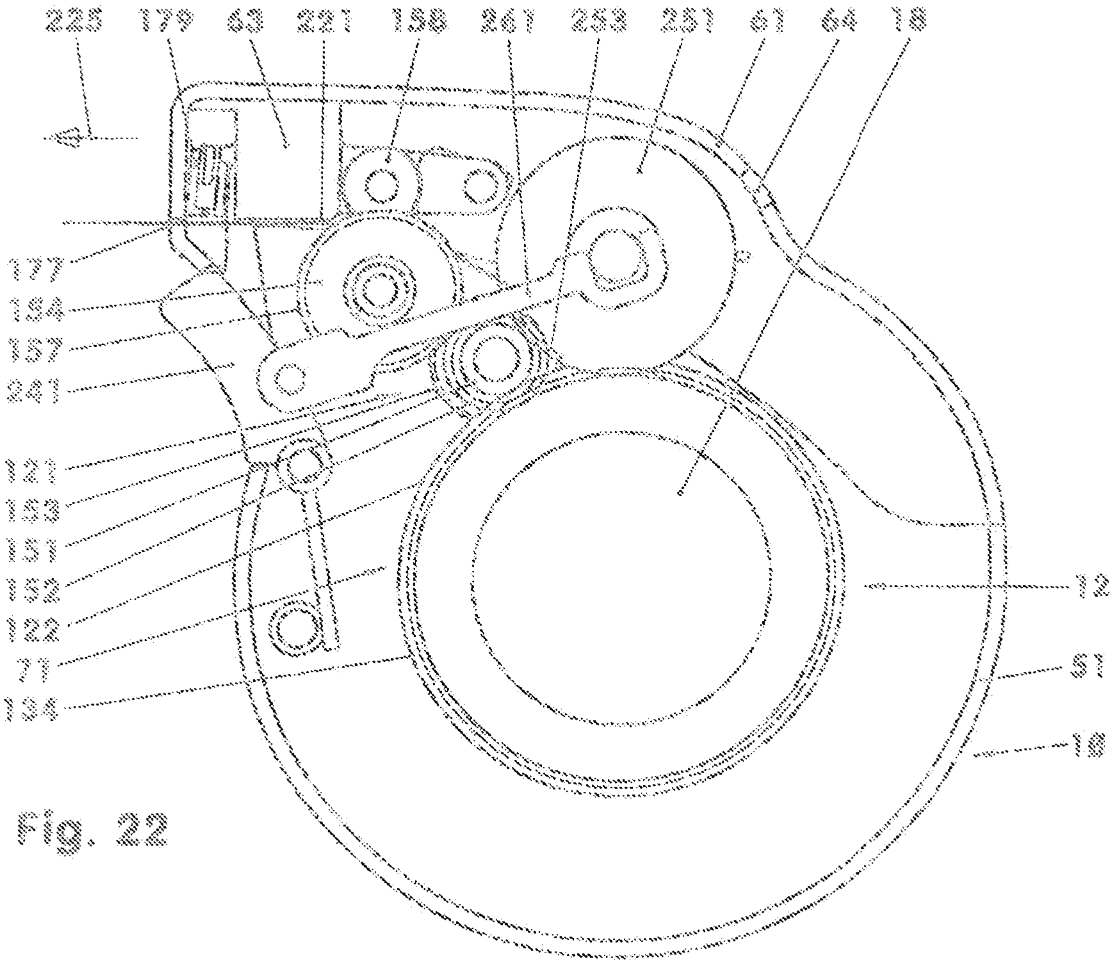
FIG. 22: bottom view of the device from FIG. 20 with housing bottom part removed.
Figure 23:
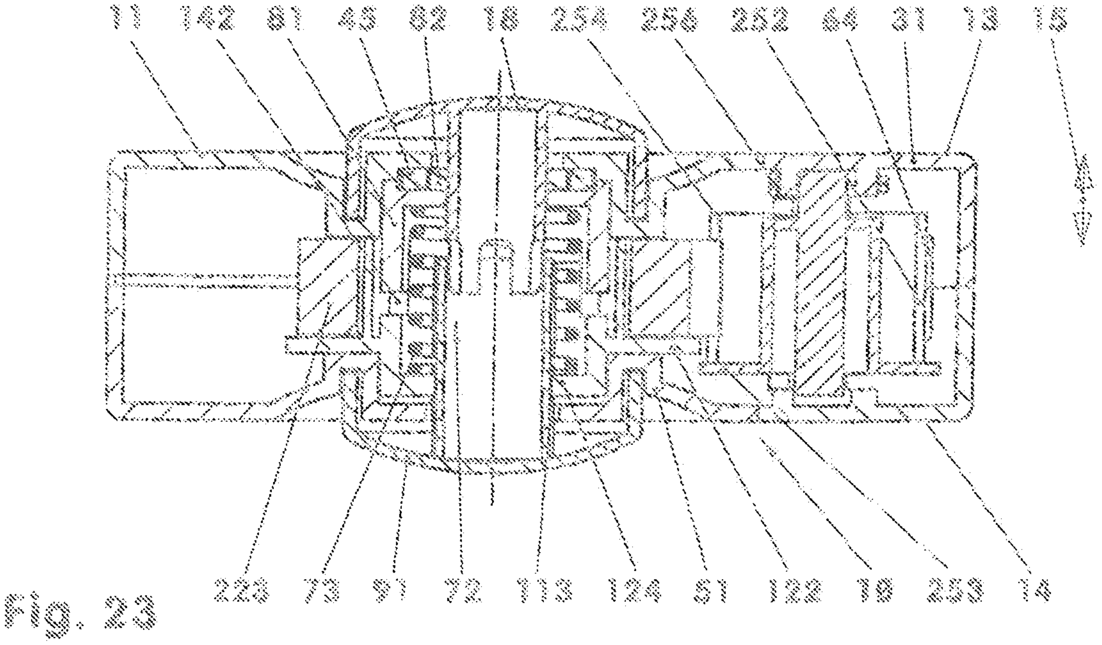
FIG. 23: longitudinal section of the device according to FIG. 20 with a section plane spanned by the axis of the indexing coupling mechanism and the axis of the counting mechanism.
Figure 24:
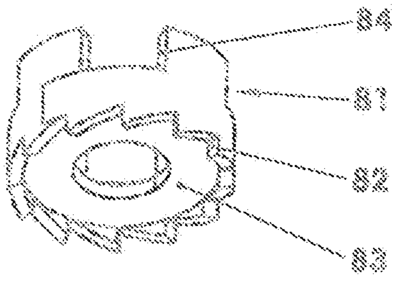
FIG. 24: isometric view of a ratchet wheel.
Figure 25:
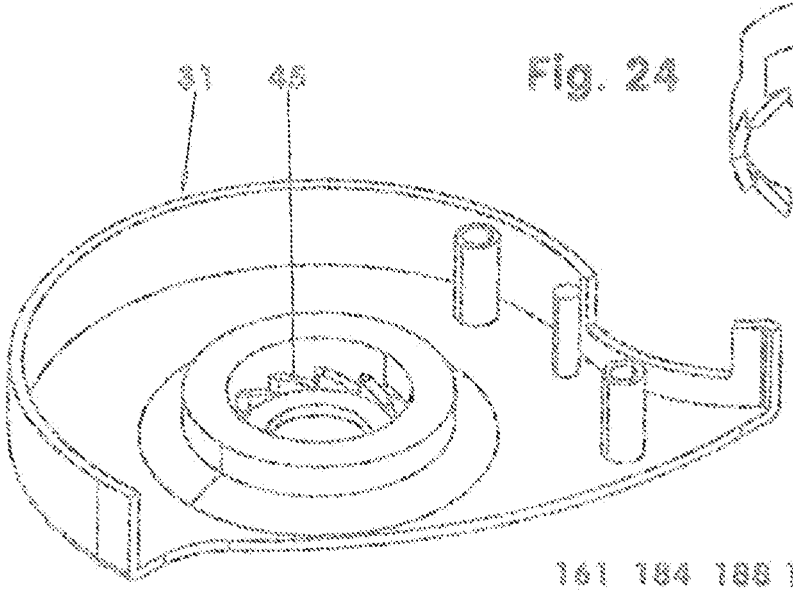
FIG. 25: isometric view of a housing bottom part.

On its free end, the rocker button (241) has a driver peg (245), which in the illustration in FIG. 21 engages into the guide slot (185) of the pivot frame (171). In the illustrated rest position, the driver peg (245) is situated at the apex of the guide slot (185). In this position, the pivot frame (171) is spaced apart from the band (221). When the rocker button (241) is pushed in, the driver peg (245) travels along the stroke section (186) of the guide slot (185). The pivot frame (171) is raised counter to the force of the return pivot spring (173). As soon as the driver peg (245) reaches the free-running section (187), the severing device (161) is accelerated in the direction of the band (221) by means of the return pivot spring (173). After a strip has been severed, the rocker button (241) is pivoted back into the initial position for example by means of a spring. Here, the driver peg (245) travels along the guide section (189) in the direction of the apex.

The intermediate wheel (151) drives a counting mechanism (251). The counting mechanism (251) has a counting wheel segment (253) which is designed as a toothed wheel segment and which drives a counting drum (254) with the indicator (252) and also drives a decoupling device (261). As the intermediate wheel (151) rotates, the counting drum (254) is rotated onward by in each case one drum segment. Here, a resetting spring (256) designed as a torsion spring (256) is placed under stress. In the exemplary embodiment, the counting drum (254) can be advanced from the initial position by at most five drum segments. The toothed wheel segment (253) then blocks a further rotation of the intermediate wheel (151). For example, a cylindrical shell section with the tip circle radius of the toothed wheel segment (253) delimits the toothed wheel segment (253) on both sides in a circumferential direction. The drum segments are for example visible through a viewing window (64) of the housing (11).

The decoupling device (261) is coupled to the rocker button (241). Said decoupling device comprises a fork rod (262) which is mounted pivotably on the rocker button (241). The fork rod (262) has two fork arms (263), the free ends of which are each formed as a shaft receptacle (264). The counting mechanism (251) mounted in the housing cap (61) is additionally held in said shaft receptacle (264). The fork arms (263) may for example be guided on the housing (11) in a linear guide. The counting mechanism (251) may also be coupled to the drive wheel (122) or to the output roller (154).

During the assembly of the device (10), it is for example the case that both the components of the indexing coupling mechanism (72) and the components of the wheel transmission (121) are inserted into the housing bottom part (31). The rocker button (241) with the decoupling device (261), and the band (221), are also inserted into the housing bottom part (31).

The pivot frame (171) and the counting mechanism (251) are inserted into the housing cap (61). After the housing cover (51) has been mounted, the rotary knob (91) and the covering cap (18) are mounted and for example locked with detent action.

To discharge a strip of active ingredient-containing or active ingredient-carrying band (221), the operator rotates the rotary knob (91) for example counterclockwise. The indexing coupling mechanism (72) indexes the drive wheel (122) onward in individual steps, wherein the individual steps are acoustically and haptically perceptible to the operator owing to the ratchet coupling (81, 31). Via the wheel transmission (121), the drive wheel (122) drives the output roller (154), which conveys the band (221) in the conveying direction (225). The counting mechanism (251) indicates that one section of the band (221), for example one dose unit, has been conveyed. If it is sought to generate a strip of relatively great length, the rotary knob (91) is rotated again. The counting mechanism (251) is incremented. The maximum length of the strip—and thus the maximum active ingredient dose—is limited by the blocking of the wheel transmission (121) by means of the toothed wheel segment (253). To sever the strip, the rocker button (241) is depressed, whereby the severing device (161) is actuated. The severed strip is held by means of the severing device (161) and can now be removed. At the same time, the decoupling device (261) is actuated, whereby the coupling of the toothed wheel segment (253) to the intermediate wheel (151) is eliminated. The counting drum (254) rotates, under load exerted by the resetting spring (256), back into its initial position. Upon the next use, the counting of the units begins anew.

Figure 27:
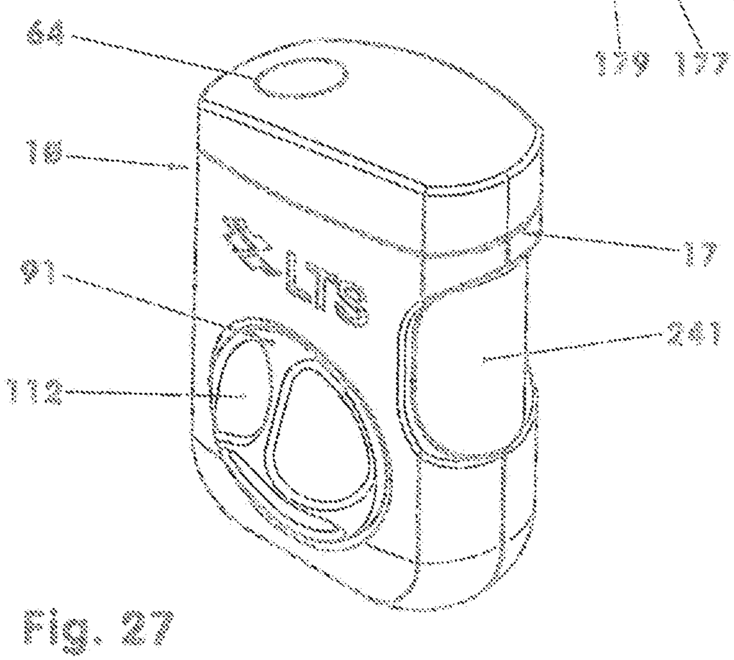
FIG. 27: isometric view of a further embodiment of a device for dispensing strips with rotatable triggering element.

FIG. 27 shows a further embodiment of a device (10) of said type. The rotary knob (91) is arranged on a side surface of the housing (11) and has grip depressions (112). The rocker button (241) is arranged on an end side below the discharge region (17). The viewing window (64) for the counting mechanism (251) is situated on a further surface, which is arranged for example adjacent to the two above-mentioned surfaces.

Combinations of the stated exemplary embodiments are also conceivable.

LIST OF REFERENCE DESIGNATIONS

10 Device for dispensing strips, dispenser device
11 Housing
12 Spool chamber
13 Bottom side
14 Top side
15 Longitudinal direction
16 Circumferential surface
17 Discharge region
18 Cover, covering cap
19 Support peg
21 Counterholder
22 Grip
23 Pivot axis
24 Detent rail
31 Housing bottom part, bottom shell
32 Housing journal, rotary journal
34 Guide pins
35 Bottom housing guide tube
36 End abutment surfaces
37 Guide tube ribs
38 Spring peg
39 Aperture
41 Indexing button recess
42 Band guide element
43 Journal stop
44 Bearing journal
45 Counterpart toothing, sawtooth toothing
51 Housing top part, top shell, housing cover
52 Top shell housing journal, pivot journal
53 Viewing window
55 Journal recess
61 Housing cap
62 Pivot journal
63 Guide element
64 Viewing window for counting mechanism
68 Protective flap
71 Drive device
72 Indexing coupling mechanism
73 Spring element, indexing spring, pressure spring
74 Indexing pinion
75 Spring receptacle
76 Indexing peg
77 Support ring
78 Bore
79 Indexing surfaces
81 Ratchet wheel
82 Sawtooth toothing
83 Base of (81)
84 Driver grooves
91 Triggering element, indexing button, triggering lever, rotary knob
92 Guide cylinder
93 Indexing button guide webs
94 Indexing button guide surfaces
95 Free surface
96 End surface
97 Guide apertures
98 Actuating head
99 Resetting spring
101 Grip lever
102 Blade holder lever
103 Pivot bearing
104 Detent guide
105 Indexing spring, pressure spring
106 Detent element
108 Wedge surface
109 Grip piece of (91)
111 Driver peg
112 Grip depressions

113 Driver lugs
121 Wheel transmission, rolling-contact transmission
122 Drive wheel
123 Axis of (122)
124 Hub
125 Web
126 Apertures
127 Rolling collar
128 Driver
129 Longitudinal bore
131 Driver grooves
132 Groove stop
133 Internal toothing
134 External toothing, involute toothing
135 Detent teeth
136 Detent tooth spaces
137 Detent tooth flanks
138 Groove base
139 Detent tooth tip
141 Insertion bevel
142 Driver peg
151 Intermediate wheel
152 First toothing of (151)
153 Second toothing of (151)
154 Output roller
155 Axis of (154)
156 Rolling surface
157 Rolling region
158 Pressure-exerting roller, counterpressure roller
159 Axis of (158)
161 Severing device
162 Camshaft
163 Cylinder-section-shaped region
164 Cam tip region
165 Polygonal shaft, pivot shaft
166 Bearing regions
167 Hexagonal pegs
171 Pivot frame
172 Frame arms
173 Resetting spring, return pivot spring
174 Transverse web
175 Blade holder
177 Cutting blade, severing tool
178 Cutting edge
179 Hold-down means
181 Hold-down means flexural springs
182 Hold-down means flexural springs
183 Pivot hub
184 Pivot web
185 Guide slot
186 Stroke section
187 Free-running section
188 Return stroke section
189 Guide section
192 Hold-down means spring, leaf spring for (179)
193 Cutout
201 Detent slide
202 Slide section, slide bar
203 Pressure spring region
204 Flexural spring region
205 Actuating bar
206 Webs
207 Flexural webs
211 Detent wheel
212 Detent catch
213 Marking, remaining quantity indicator
221 Band
222 Free end
223 Spool
225 Conveying direction
231 Dosing device
232 Dosing lever
233 Dosing slide
234 Guide shell
235 Cylindrically-shaped section
236 Insertion bevel
241 Rocker button, severing device actuating element
242 Pivot axis
243 Rocker stop
244 Grip region
245 Driver peg
251 Counting mechanism
252 Indicator, dose unit indicator
253 Toothed wheel segment
254 Counting drum
256 Resetting spring, torsion spring
261 Decoupling device
262 Fork rod
263 Fork arms
264 Shaft receptacle

What is claimed is:

1. A dispenser device (10) configured to dispense active ingredient-containing film or active ingredient-carrying film strips, having a housing (11), in which housing there is arranged a drive device (71) including an index coupling mechanism (72) and a wheel transmission (121), a spool chamber (12) configured to accommodate an active ingredient-containing or active ingredient-carrying film band (221), in which housing the wheel transmission (121) is mounted with an output roller (154) configured to convey the film band (221), and in which housing there is arranged a severing device (161) configured to sever the strips from the band (221), characterized in that, the wheel transmission (121) includes a drive wheel (122) having an external spur gear toothing (134) configured for engaging toothing of an intermediate wheel (151) for driving an output roller (154) configured to pull the active ingredient containing film or active ingredient-carrying film band (221), the indexing coupling mechanism (72) is positioned upstream of the wheel transmission (121), the indexing coupling mechanism (72) has a manually actuatable rotatable triggering element (91) axially mounted rotatably in the housing (11), the rotatable triggering element (91) has a plurality of driver lugs (113) which engage into and behind a hub (124), the drive wheel (122) is coupled by driver pegs (142) to a rachet wheel (81) of pot-shaped form, the ratchet wheel (81) is displaceable relative to the drive wheel (122) in the longitudinal direction, the ratchet wheel (81) has driver grooves (84) into which the driver pegs (142) of the drive wheel (122) engage, the ratchet wheel (81) has a base (83) averted from the rotatable triggering element (91) with an encircling sawtooth toothing (82) which engages into a corresponding counterpart toothing (45) of a bottom shell (31), between the base (83) and the drive wheel (122) there is arranged an indexing spring (73) in the form of a pressure spring configured to always push the base (83) of the ratchet wheel (81) and the drive wheel (122) apart, and the output roller (154) is driveable in incremental steps by the indexing coupling mechanism (72).

2. The dispenser device (10) as claimed in claim 1, characterized in that, the output roller (154) is loaded in a radial direction by a pressure-exerting roller (158).

3. The dispenser device (10) as claimed in claim 1, characterized in that, the indexing coupling mechanism (72) has a positively locking indexing coupling.

4. The dispenser device (10) as claimed in claim 1, characterized in that, the severing device (161) is unblockable and has a severing tool (177).

5. The dispenser device (10) as claimed in claim 1, characterized in that, the dispenser device (10) includes a manually actuated rocker button (241) for actuating the severing device (161).

6. The dispenser device (10) as claimed in claim 5, characterized in that, the dispenser device (10) further includes a decoupling device (261) in operative arrangement with the manually actuated rocker button (241) for permitting resetting of a counting mechanism (251) for counting a strip of predetermined length.

7. The dispenser device (10) as claimed in claim 1, characterized in that, the maximum length of the severable strip can be limited.

8. The dispenser device (10) as claimed in claim 1, characterized in that, a drive device (71) which has the indexing coupling mechanism (72) and the wheel transmission (121) is coupled to a dose unit indicator (252).

9. The dispenser device (10) as claimed in claim 1, characterized in that, the rotatable triggering element (91) comprises a rotary knob.

10. A method for dispensing active ingredient-containing film or active ingredient-carrying film strips by a dispenser device (10) configured to dispense active ingredient-containing film or active ingredient-carrying film strips, having a housing (11), in which housing there is arranged a drive device (71) including an index coupling mechanism (72) and a wheel transmission (121), a spool chamber (12) configured to accommodate an active ingredient-containing or active ingredient-carrying film band (221), in which housing the wheel transmission (121) is mounted with an output roller (154) configured to convey the film band (221), and in which housing there is arranged a severing device (161) configured to sever the strips from the band (221), characterized in that, the wheel transmission (121) includes a drive wheel (122) having an external spur gear toothing (134) configured for engaging toothing of an intermediate wheel (151) for driving an output roller (154) configured to pull the active ingredient containing film or active ingredient-carrying film band (221), the indexing coupling mechanism (72) is positioned upstream of the wheel transmission (121), the indexing coupling mechanism (72) has a manually actuatable rotatable triggering element (91) axially mounted rotatably in the housing (11), the rotatable triggering element (91) has a plurality of driver lugs (113) which engage into and behind a hub (124), the drive wheel (122) is coupled by driver pegs (142) to a rachet wheel (81) of pot-shaped form, the ratchet wheel (81) is displaceable relative to the drive wheel (122) in the longitudinal direction, the ratchet wheel (81) has driver grooves (84) into which the driver pegs (142) of the drive wheel (122) engage, the ratchet wheel (81) has a base (83) averted from the rotatable triggering element (91) with an encircling sawtooth toothing (82) which engages into a corresponding counterpart toothing (45) of a bottom shell (31), between the base (83) and the drive wheel (122) there is arranged an indexing spring (73) in the form of a pressure spring configured to always push the base (83) of the ratchet wheel (81) and the drive wheel (122) apart, and the output roller (154) is driveable in incremental steps by the indexing coupling mechanism (72), wherein the active ingredient-containing or active ingredient-carrying film band (221) is arranged between the output roller (154) and the pressure-exerting roller (158), said method comprising the following steps:

a manual actuation of the rotatable triggering element (91) triggers an indexing of the indexing coupling mechanism (72), the indexing of the indexing coupling mechanism (72) couples a movement of the rotatable triggering element (91) to the rotation of a drive wheel (122) in individual steps, such that the drive wheel (122) rotates through a defined angle of rotation, the drive wheel (122) transmits the rotational movement by the wheel transmission (121) to the output roller (154), the rotating output roller (154) conveys the band (221), the conveying of the band (221) by the travel that is dependent on the defined angle of rotation of the drive wheel (122), a strip is severed from the band (221) by manually actuating a rocker button (241) for actuating the severing device (161).

11. The method as claimed in claim 10, further comprising the step of after severing the strip from the band (221) resetting of a dose unit indicator (252) by permitting resetting of a counting mechanism (251) for counting a strip of predetermined length.

12. The method as claimed in claim 10, wherein the rotation of the drive wheel (122) in individual steps are acoustically and haptically perceptible to an operator.

* * * * *